(12) United States Patent
Arnone et al.

(10) Patent No.: US 9,715,783 B2
(45) Date of Patent: *Jul. 25, 2017

(54) SYSTEMS FOR FLEXIBLE GAMING ENVIRONMENTS

(71) Applicant: Gamblit Gaming, LLC, Glendale, CA (US)

(72) Inventors: Miles Arnone, Sherborn, MA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,148

(22) Filed: Apr. 26, 2016

(65) Prior Publication Data

US 2016/0240046 A1 Aug. 18, 2016

Related U.S. Application Data

(63) Continuation of application No. 14/720,624, filed on May 22, 2015, which is a continuation of application
(Continued)

(51) Int. Cl.
*G07F 17/32* (2006.01)
*A63F 13/55* (2014.01)
(Continued)

(52) U.S. Cl.
CPC .......... *G07F 17/3225* (2013.01); *A63F 13/12* (2013.01); *A63F 13/55* (2014.09);
(Continued)

(58) Field of Classification Search
CPC ... G07F 17/32; G07F 17/3223; G07F 17/3227
See application file for complete search history.

(56) References Cited

U.S. PATENT DOCUMENTS 5,413,357 A 5/1995 Schulze et al.
5,718,429 A 2/1998 Keller
(Continued)

FOREIGN PATENT DOCUMENTS

AL 9851384 A1 11/1998
JP 0130098 A 10/2001
(Continued)

OTHER PUBLICATIONS itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.

(Continued)

*Primary Examiner* — Corbett B Coburn
(74) *Attorney, Agent, or Firm* — Caitlyn Ross

(57) ABSTRACT

A regulated hybrid gaming system comprised of a terminal including an entertainment software controller coupled to a gaming environment multiplexer, wherein the entertainment software controller receives credit and provides an entertainment game; a real world controller provides a gambling game; and the gaming environment multiplexer which receives from a game world controller a request to couple the game world controller to the entertainment software engine providing the entertainment game; determines that the game world controller is approved for a regulatory regime; and couples the game world controller to the entertainment software controller, when the multiplexer determines that the game world controller is approved for the regulatory regime.

10 Claims, 12 Drawing Sheets

Related U.S. Application Data

No. 14/304,027, filed on Jun. 13, 2014, now Pat. No. 9,039,536, which is a continuation of application No. 14/043,838, filed on Oct. 1, 2013, now Pat. No. 8,753,212, which is a continuation of application No. 13/872,946, filed on Apr. 29, 2013, now Pat. No. 8,562,445, which is a continuation of application No. PCT/US2012/040800, filed on Jun. 4, 2012.

(60) Provisional application No. 61/519,981, filed on Jun. 2, 2011, provisional application No. 61/604,347, filed on Feb. 28, 2012.

(51) Int. Cl.
*A63F 13/80* (2014.01)
*A63F 13/30* (2014.01)

(52) U.S. Cl.
CPC ............. *A63F 13/80* (2014.09); *G07F 17/32* (2013.01); *G07F 17/326* (2013.01); *G07F 17/3223* (2013.01); *G07F 17/3227* (2013.01); *G07F 17/3241* (2013.01); *G07F 17/3244* (2013.01)

(56) References Cited

U.S. PATENT DOCUMENTS

| | | | |
|---|---|---|---|
| 5,785,592 A | 7/1998 | Jacobsen | |
| 5,853,324 A | 12/1998 | Kami et al. | |
| 5,963,745 A * | 10/1999 | Collins | G06F 9/3838 712/10 |
| 6,050,895 A * | 4/2000 | Luciano, Jr. | G07F 17/3295 463/20 |
| 6,165,071 A | 12/2000 | Weiss | |
| 6,227,974 B1 | 5/2001 | Eilat | |
| 6,267,669 B1 | 7/2001 | Luciano | |
| 6,685,563 B1 | 2/2004 | Meekins et al. | |
| 6,712,693 B1 | 3/2004 | Hettinger | |
| 6,761,632 B2 | 7/2004 | Nolz et al. | |
| 6,761,633 B2 | 7/2004 | Riendeau | |
| 6,764,397 B1 | 7/2004 | Robb | |
| 6,811,482 B2 | 11/2004 | Letovsky | |
| 6,875,110 B1 * | 4/2005 | Crumby | G07F 17/3202 463/42 |
| 7,118,105 B2 | 10/2006 | Benevento | |
| 7,294,058 B1 | 11/2007 | Slomiany | |
| 7,326,115 B2 | 2/2008 | Baerlocher | |
| 7,361,091 B2 | 4/2008 | Letovsky | |
| 7,517,282 B1 | 4/2009 | Pryor | |
| 7,575,517 B2 | 8/2009 | Parham et al. | |
| 7,682,239 B2 | 3/2010 | Friedman et al. | |
| 7,720,733 B2 | 5/2010 | Jung | |
| 7,753,770 B2 | 7/2010 | Walker et al. | |
| 7,753,790 B2 | 7/2010 | Nguyen | |
| 7,766,742 B2 * | 8/2010 | Bennett | G07F 17/34 273/138.1 |
| 7,775,885 B2 | 8/2010 | Van Luchene | |
| 7,798,896 B2 | 9/2010 | Katz | |
| 7,828,657 B2 | 11/2010 | Booth | |
| 7,917,371 B2 | 3/2011 | Jung et al. | |
| 7,931,531 B2 | 4/2011 | Oberberger | |
| 7,938,727 B1 | 5/2011 | Konkle | |
| 7,950,993 B2 | 5/2011 | Oberberger | |
| 7,967,674 B2 | 6/2011 | Baerlocher | |
| 7,980,948 B2 | 7/2011 | Rowe | |
| 7,996,264 B2 | 8/2011 | Kusumoto et al. | |
| 8,012,023 B2 | 9/2011 | Gates | |
| 8,047,908 B2 | 11/2011 | Walker | |
| 8,047,915 B2 | 11/2011 | Lyle | |
| 8,060,829 B2 | 11/2011 | Jung et al. | |
| 8,075,383 B2 | 12/2011 | Friedman et al. | |
| 8,087,999 B2 | 1/2012 | Oberberger | |
| 8,113,938 B2 * | 2/2012 | Friedman | G07F 17/3295 463/16 |
| 8,118,654 B1 | 2/2012 | Nicolas | |
| 8,128,487 B2 | 3/2012 | Hamilton et al. | |
| 8,135,648 B2 | 3/2012 | Oram | |
| 8,137,193 B1 | 3/2012 | Kelly et al. | |
| 8,142,272 B2 | 3/2012 | Walker | |
| 8,157,653 B2 | 4/2012 | Buhr | |
| 8,167,699 B2 | 5/2012 | Inamura | |
| 8,177,628 B2 | 5/2012 | Manning | |
| 8,182,338 B2 | 5/2012 | Thomas | |
| 8,182,339 B2 | 5/2012 | Anderson | |
| 8,187,068 B2 | 5/2012 | Slomiany | |
| 8,206,210 B2 | 6/2012 | Walker | |
| 8,308,544 B2 | 11/2012 | Friedman | |
| 8,430,735 B2 | 4/2013 | Oberberger | |
| 8,480,470 B2 | 7/2013 | Napolitano et al. | |
| 8,562,445 B2 * | 10/2013 | Arnone | A63F 13/12 463/29 |
| 8,622,809 B1 | 1/2014 | Arora et al. | |
| 8,753,212 B2 * | 6/2014 | Arnone | A63F 13/12 463/42 |
| 8,864,564 B2 | 10/2014 | Oberberger | |
| 9,039,536 B2 * | 5/2015 | Arnone | A63F 13/12 463/42 |
| 2001/0004609 A1 | 6/2001 | Walker et al. | |
| 2001/0019965 A1 | 9/2001 | Ochi | |
| 2002/0022509 A1 | 2/2002 | Nicastro | |
| 2002/0090990 A1 | 7/2002 | Joshi et al. | |
| 2002/0165023 A1 * | 11/2002 | Brosnan | G07F 17/32 463/29 |
| 2002/0175471 A1 | 11/2002 | Faith | |
| 2003/0060286 A1 | 3/2003 | Walker et al. | |
| 2003/0119576 A1 | 6/2003 | McClintic et al. | |
| 2003/0139214 A1 | 7/2003 | Wolf et al. | |
| 2003/0171149 A1 | 9/2003 | Rothschild | |
| 2003/0204565 A1 | 10/2003 | Guo et al. | |
| 2003/0211879 A1 | 11/2003 | Englman | |
| 2004/0024666 A1 | 2/2004 | Walker et al. | |
| 2004/0092313 A1 | 5/2004 | Saito et al. | |
| 2004/0102238 A1 | 5/2004 | Taylor | |
| 2004/0121839 A1 | 6/2004 | Webb | |
| 2004/0225387 A1 | 11/2004 | Smith | |
| 2005/0003878 A1 | 1/2005 | Updike | |
| 2005/0096124 A1 | 5/2005 | Stronach | |
| 2005/0116411 A1 | 6/2005 | Herrmann et al. | |
| 2005/0148393 A1 * | 7/2005 | Crumby | G07F 17/3202 463/42 |
| 2005/0187020 A1 | 8/2005 | Amaitis et al. | |
| 2005/0192087 A1 | 9/2005 | Friedman et al. | |
| 2005/0233791 A1 | 10/2005 | Kane | |
| 2005/0233806 A1 | 10/2005 | Kane et al. | |
| 2005/0239538 A1 * | 10/2005 | Dixon | G07F 17/3267 463/20 |
| 2005/0269778 A1 | 12/2005 | Samberg | |
| 2005/0288101 A1 | 12/2005 | Lockton et al. | |
| 2006/0003823 A1 | 1/2006 | Zhang | |
| 2006/0003830 A1 | 1/2006 | Walker et al. | |
| 2006/0035696 A1 | 2/2006 | Walker | |
| 2006/0040735 A1 | 2/2006 | Baerlocher | |
| 2006/0068913 A1 | 3/2006 | Walker et al. | |
| 2006/0084499 A1 | 4/2006 | Moshal | |
| 2006/0084505 A1 | 4/2006 | Yoseloff | |
| 2006/0135250 A1 | 6/2006 | Rossides | |
| 2006/0154710 A1 | 7/2006 | Serafat | |
| 2006/0166729 A1 | 7/2006 | Saffari et al. | |
| 2006/0189371 A1 | 8/2006 | Walker et al. | |
| 2006/0223611 A1 | 10/2006 | Baerlocher | |
| 2006/0234791 A1 | 10/2006 | Nguyen et al. | |
| 2006/0240890 A1 | 10/2006 | Walker | |
| 2006/0246403 A1 | 11/2006 | Monpouet et al. | |
| 2006/0258433 A1 | 11/2006 | Finocchio et al. | |
| 2007/0026924 A1 | 2/2007 | Taylor | |
| 2007/0035548 A1 | 2/2007 | Jung et al. | |
| 2007/0038559 A1 | 2/2007 | Jung et al. | |
| 2007/0064074 A1 | 3/2007 | Silverbrook et al. | |
| 2007/0087799 A1 | 4/2007 | Van Luchene | |
| 2007/0093299 A1 | 4/2007 | Bergeron | |
| 2007/0099696 A1 | 5/2007 | Nguyen et al. | |
| 2007/0117641 A1 | 5/2007 | Walker et al. | |
| 2007/0129149 A1 | 6/2007 | Walker | |

(56) References Cited

U.S. PATENT DOCUMENTS

| | | |
|---|---|---|
| 2007/0142108 A1 | 6/2007 | Linard |
| 2007/0156509 A1 | 7/2007 | Jung et al. |
| 2007/0167212 A1 | 7/2007 | Nguyen |
| 2007/0167239 A1* | 7/2007 | O'Rourke ............... G07F 17/32 463/42 |
| 2007/0173311 A1 | 7/2007 | Morrow et al. |
| 2007/0191104 A1 | 8/2007 | Van Luchene |
| 2007/0202941 A1 | 8/2007 | Miltenberger |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0076572 A1 | 3/2008 | Nguyen et al. |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0275393 A1 | 11/2009 | Kisenwether |
| 2009/0291755 A1 | 11/2009 | Walker et al. |
| 2009/0309305 A1 | 12/2009 | May |
| 2009/0312093 A1* | 12/2009 | Walker .................... G07F 17/32 463/25 |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0167822 A1* | 7/2010 | Crumby ............... G07F 17/3202 463/42 |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0009188 A1 | 1/2011 | Adiraju et al. |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105222 A1 | 5/2011 | Gagner et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers et al. |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1* | 11/2012 | Luciano, Jr. .......... G07F 17/326 463/17 |
| 2012/0322545 A1* | 12/2012 | Arnone ............... G07F 17/3272 463/25 |
| 2013/0029760 A1 | 1/2013 | Wickett |
| 2013/0131848 A1* | 5/2013 | Arnone ............... G07F 17/3244 700/91 |
| 2013/0190074 A1* | 7/2013 | Arnone ............... G07F 17/3272 463/25 |
| 2013/0260869 A1 | 10/2013 | Basallo et al. |
| 2014/0087801 A1 | 3/2014 | Nicely et al. |
| 2014/0087808 A1 | 3/2014 | Basallo et al. |
| 2014/0087809 A1 | 3/2014 | Leupp et al. |
| 2014/0357350 A1 | 12/2014 | Weingardt et al. |

FOREIGN PATENT DOCUMENTS

| | | |
|---|---|---|
| JP | 03111980 A | 4/2003 |
| JP | 2004097610 A | 4/2004 |
| JP | 20040097610 | 4/2004 |
| JP | 20040097610 A1 | 4/2004 |
| JP | 2004166746 A | 6/2004 |
| WO | 2010087090 A1 | 8/2010 |

(56) References Cited

FOREIGN PATENT DOCUMENTS

| WO | WO2011109454 | 9/2011 |
|----|--------------|--------|
| WO | WO2012078668 | 6/2012 |
| WO | 2012139083 A1 | 10/2012 |
| WO | WO2012139083 | 10/2012 |

OTHER PUBLICATIONS

Changing the Virtual Self: Avatar Transformations in Popular Games; Barr et al., Victoria Univ., NZ, 2006.
Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/961,849, Arnone, et al., filed Aug. 7, 2013.
WIPO—ISA, International Search Report and Written Opinion, PCT/US12/40800, Sep. 4, 2012.
WIPO—IPEA, International Preliminary Report on Patentability (with annexes), PCT/US12/40800, Aug. 8, 2013.
Cire, Frank, Response to International Preliminary Report on Patentability, Aug. 14, 2013.
Australian Intellectual Property Office, First Patent Examination Report, Application No. 2012261817, Jan. 29, 2014.
U.S. Appl. No. 14/185,847, Arnone, et al., filed Feb. 20, 2014.
U.S. Appl. No. 14/203,459, Arnone, et al., filed Mar. 10, 2014.
U.S. Appl. No. 14/205,272, Arnone, et al., filed Mar. 11, 2014.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813, Arnone, et al., filed Feb. 6, 2014.
U.S. Appl. No. 14/175,986, Arnone, et al., filed Feb. 7, 2014.
U.S. Appl. No. 14/176,014, Arnone, et al., filed Feb. 7, 2014.
U.S. Appl. No. 14/179,487, Arnone, et al., filed Feb. 12, 2014.
U.S. Appl. No. 14/179,492, Arnone, et al., filed Feb. 12, 2014.
U.S. Appl. No. 14/179,492, Arnone, et al., filed Feb. 14, 2014.
U.S. Appl. No. 14/186,393, Arnone, et al., filed Feb. 21, 2014.
U.S. Appl. No. 14/188,587, Arnone, et al., filed Feb. 24, 2014.
U.S. Appl. No. 14/205,303, Arnone, et al., filed Mar. 11, 2014.
U.S. Appl. No. 14/205,306, Arnone, et al., filed Mar. 11, 2014.
U.S. Appl. No. 14/209,485, Arnone, et al., filed Mar. 13, 2014.
U.S. Appl. No. 14/214,310, Arnone, et al., filed Mar. 14, 2014.
U.S. Appl. No. 14/222,520, Arnone, et al., filed Mar. 21, 2014.
U.S. Appl. No. 14/253,813, Arnone, et al., filed Apr. 15, 2014.
U.S. Appl. No. 14/255,253, Arnone, et al., filed Apr. 17, 2014.
U.S. Appl. No. 14/255,919, Arnone, et al., filed Apr. 17, 2014.
U.S. Appl. No. 14/263,988, Arnone, et al., filed Apr. 28, 2014.
U.S. Appl. No. 14/270,335, Arnone, et al., filed May 5, 2014.
U.S. Appl. No. 14/271,360, Arnone, et al., filed May 6, 2014.
U.S. Appl. No. 13/746,850, Arnone, et al., filed Jan. 22, 2013.
U.S. Appl. No. 14/288,169, Arnone, et al., filed May 27, 2014.
U.S. Appl. No. 14/304,027, Arnone, et al., filed Jun. 13, 2014.
U.S. Appl. No. 14/306,187, Arnone, et al., filed Jun. 16, 2014.
U.S. Appl. No. 14/312,623, Arnone, et al., filed Jun. 23, 2014.
U.S. Appl. No. 14/330,249, Arnone, et al., filed Jul. 14, 2014.
U.S. Appl. No. 14/339,142, Arnone, et al., filed Jul. 23, 2014.
U.S. Appl. No. 14/458,206, Arnone, et al., filed Aug. 12, 2014.
U.S. Appl. No. 14/461,344, Arnone, et al., filed Aug. 15, 2014.
U.S. Appl. No. 14/462,516, Arnone, et al., filed Aug. 18, 2014.
U.S. Appl. No. 14/467,646, Meyerhofer, et al., filed Aug. 25, 2014.
U.S. Appl. No. 14/474,023, Arnone, et al., filed Aug. 29, 2014.
U.S. Appl. No. 14/486,895, Arnone, et al., filed Sep. 15, 2014.
U.S. Appl. No. 14/507,206, Arnone, et al., filed Oct. 6, 2014.
U.S. Appl. No. 14/521,338, Arnone, et al., filed Oct. 22, 2014.
U.S. Appl. No. 14/535,808, Arnone, et al., filed Nov. 7, 2014.
U.S. Appl. No. 14/535,816, Arnone, et al., filed Nov. 7, 2014.
U.S. Appl. No. 14/536,231, Arnone, et al., filed Nov. 7, 2014.
U.S. Appl. No. 14/536,280, Arnone, et al., filed Nov. 7, 2014.
U.S. Appl. No. 14/549,137, Arnone, et al., filed Nov. 20, 2014.
U.S. Appl. No. 14/550,802, Arnone, et al., filed Nov. 21, 2014.
U.S. Appl. No. 14/555,401, Arnone, et al., filed Nov. 26, 2014.
U.S. Appl. No. 14/559,840, Arnone, et al., filed Dec. 3, 2014.
U.S. Appl. No. 14/564,834, Arnone, et al., filed Dec. 9, 2014.
U.S. Appl. No. 14/570,746, Arnone, et al., filed Dec. 15, 2014.
U.S. Appl. No. 14/570,857, Arnone, et al., filed Dec. 15, 2014.
U.S. Appl. No. 14/586,626, Arnone, et al., filed Dec. 30, 2014.
U.S. Appl. No. 14/586,639, Arnone, et al., filed Dec. 30, 2014.
U.S. Appl. No. 14/815,764, Arnone, et al., filed Jul. 31, 2015.
U.S. Appl. No. 14/815,774, Arnone, et al., filed Jul. 31, 2015.
U.S. Appl. No. 14/817,032, Arnone, et al., filed Aug. 3, 2015.
U.S. Appl. No. 14/822,890, Arnone, et al., filed Aug. 10, 2015.
U.S. Appl. No. 14/823,951, Arnone, et al., filed Aug. 11, 2015.
U.S. Appl. No. 14/823,987, Arnone, et al., filed Aug. 11, 2015.
U.S. Appl. No. 14/825,056, Arnone, et al., filed Aug. 12, 2015.
U.S. Appl. No. 14/835,590, Arnone, et al., filed Aug. 25, 2015.
U.S. Appl. No. 14/836,902, Arnone, et al., filed Aug. 26, 2015.
U.S. Appl. No. 14/839,647, Arnone, et al., filed Aug. 28, 2015.
U.S. Appl. No. 14/842,684, Arnone, et al., filed Sep. 1, 2015.
U.S. Appl. No. 14/842,785, Arnone, et al., filed Sep. 1, 2015.
U.S. Appl. No. 14/854,021, Arnone, et al., filed Sep. 14, 2015.
U.S. Appl. No. 14/855,322, Arnone, et al., filed Sep. 15, 2015.
U.S. Appl. No. 14/859,065, Arnone, et al., filed Sep. 18, 2015.
U.S. Appl. No. 14/865,422, Arnone, et al., filed Sep. 25, 2015.
U.S. Appl. No. 14/867,809, Arnone, et al., filed Sep. 28, 2015.
U.S. Appl. No. 14/868,287, Arnone, et al., filed Sep. 28, 2015.
U.S. Appl. No. 14/868,364, Arnone, et al., filed Sep. 28, 2015.
U.S. Appl. No. 14/869,809, Arnone, et al., filed Sep. 29, 2015.
U.S. Appl. No. 14/869,819, Arnone, et al., filed Sep. 29, 2015.
U.S. Appl. No. 14/885,894, Arnone, et al., filed Oct. 16, 2015.
U.S. Appl. No. 14/919,665, Arnone, et al., filed Oct. 21, 2015.
U.S. Appl. No. 14/942,844, Arnone, et al., filed Nov. 16, 2015.
U.S. Appl. No. 14/942,883, Arnone, et al., filed Nov. 16, 2015.
U.S. Appl. No. 14/949,759, Arnone, et al., filed Nov. 23, 2015.
U.S. Appl. No. 14/952,758, Arnone, et al., filed Nov. 25, 2015.
U.S. Appl. No. 14/952,769, Arnone, et al., filed Nov. 25, 2015.
U.S. Appl. No. 14/954,922, Arnone, et al., filed Nov. 30, 2015.
U.S. Appl. No. 14/954,931, Arnone, et al., filed Nov. 30, 2015.
U.S. Appl. No. 14/955,000, Arnone, et al., filed Nov. 30, 2015.
U.S. Appl. No. 14/956,301, Arnone, et al., filed Dec. 1, 2015.
U.S. Appl. No. 14/965,231, Arnone, et al., filed Dec. 10, 2015.
U.S. Appl. No. 14/965,846, Arnone, et al., filed Dec. 10, 2015.
U.S. Appl. No. 14/981,640, Arnone, et al., filed Dec. 28, 2015.

(56) References Cited

OTHER PUBLICATIONS

U.S. Appl. No. 14/981,775, Arnone, et al., filed Dec. 28, 2015.
U.S. Appl. No. 14/984,943, Arnone, et al., filed Dec. 30, 2015.
U.S. Appl. No. 14/984,965, Arnone, et al., filed Dec. 30, 2015.
U.S. Appl. No. 14/984,978, Arnone, et al., filed Dec. 30, 2015.
U.S. Appl. No. 14/985,107, Arnone, et al., filed Dec. 30, 2015.
U.S. Appl. No. 14/995,151, Arnone, et al., filed Jan. 13, 2016.
U.S. Appl. No. 14/974,432, Arnone, et al., filed Dec. 18, 2015.
U.S. Appl. No. 14/997,413, Arnone, et al., filed Jan. 15, 2016.
U.S. Appl. No. 15/002,233, Arnone, et al., filed Jan. 20, 2016.
U.S. Appl. No. 15/005,944, Arnone, et al., filed Jan. 25, 2016.
U.S. Appl. No. 15/011,322, Arnone, et al., filed Jan. 29, 2016.
U.S. Appl. No. 15/051,535, Arnone, et al., filed Feb. 23, 2016.
U.S. Appl. No. 15/053,236, Arnone, et al., filed Feb. 25, 2016.
U.S. Appl. No. 15/057,095, Arnone, et al., filed Feb. 29, 2016.
U.S. Appl. No. 15/060,502, Arnone, et al., filed Mar. 3, 2016.
U.S. Appl. No. 15/063,365, Arnone, et al., filed Mar. 7, 2016.
U.S. Appl. No. 15/063,496, Arnone, et al., filed Mar. 7, 2016.
U.S. Appl. No. 15/073,602, Arnone, et al., filed Mar. 17, 2016.
U.S. Appl. No. 15/074,999, Arnone, et al., filed Mar. 18, 2016.
U.S. Appl. No. 15/077,574, Arnone, et al., filed Mar. 22, 2016.
U.S. Appl. No. 15/083,284, Arnone, et al., filed Mar. 28, 2016.
U.S. Appl. No. 15/091,395, Arnone, et al., filed Apr. 5, 2016.
U.S. Appl. No. 15/093,685, Arnone, et al., filed Apr. 7, 2016.
U.S. Appl. No. 15/098,287, Arnone, et al., filed Apr. 13, 2016.
U.S. Appl. No. 15/098,313, Arnone, et al., filed Apr. 13, 2016.
U.S. Appl. No. 15/130,101, Arnone, et al., filed Apr. 15, 2016.
U.S. Appl. No. 15/133,624, Arnone, et al., filed Apr. 20, 2016.
International Search Report and Written Opinion, PCT/US12/40800, Sep. 4, 2012.
Intellectual Property Office of Singapore Search Report, IPOS Application No. 2014012736, Jan. 22, 2016.
U.S. Appl. No. 14/586,645, Arnone, et al., filed Dec. 30, 2014.
U.S. Appl. No. 14/598,151, Arnone, et al., filed Jan. 15, 2015.
U.S. Appl. No. 14/601,063, Arnone, et al., filed Jan. 20, 2015.
U.S. Appl. No. 14/601,108, Arnone, et al., filed Jan. 20, 2015.
U.S. Appl. No. 14/608,000, Arnone, et al., filed Jan. 28, 2015.
U.S. Appl. No. 14/608,087, Arnone, et al., filed Jan. 28, 2015.
U.S. Appl. No. 14/608,093, Arnone, et al., filed Jan. 28, 2015.
U.S. Appl. No. 14/610,897, Arnone, et al., filed Jan. 30, 2015.
U.S. Appl. No. 14/611,077, Arnone, et al., filed Jan. 30, 2015.
U.S. Appl. No. 14/604,629, Arnone, et al., filed Jan. 23, 2015.
U.S. Appl. No. 14/625,475, Arnone, et al., filed Feb. 18, 2015.
U.S. Appl. No. 14/617,852, Arnone, et al., filed Feb. 9, 2015.
U.S. Appl. No. 14/627,428, Arnone, et al., filed Feb. 20, 2015.
U.S. Appl. No. 14/642,427, Arnone, et al., filed Mar. 9, 2015.
U.S. Appl. No. 14/665,991, Arnone, et al., filed Mar. 23, 2015.
U.S. Appl. No. 14/666,010, Arnone, et al., filed Mar. 23, 2015.
U.S. Appl. No. 14/666,022, Arnone, et al., filed Mar. 23, 2015.
U.S. Appl. No. 14/642,623, Arnone, et al., filed Mar. 9, 2015.
U.S. Appl. No. 14/663,337, Arnone, et al., filed Mar. 19, 2015.
U.S. Appl. No. 14/666,284, Arnone, et al., filed Mar. 23, 2015.
U.S. Appl. No. 14/679,885, Arnone, et al., filed Apr. 6, 2015.
U.S. Appl. No. 14/685,378, Arnone, et al., filed Apr. 13, 2015.
U.S. Appl. No. 14/686,675, Arnone, et al., filed Apr. 14, 2015.
U.S. Appl. No. 14/686,678, Arnone, et al., filed Apr. 14, 2015.
U.S. Appl. No. 14/701,430, Arnone, et al., filed Apr. 30, 2015.
U.S. Appl. No. 14/703,721, Arnone, et al., filed May 4, 2015.
U.S. Appl. No. 14/708,138, Arnone, et al., filed May 8, 2015.
U.S. Appl. No. 14/708,141, Arnone, et al., filed May 8, 2015.
U.S. Appl. No. 14/708,160, Arnone, et al., filed May 8, 2015.
U.S. Appl. No. 14/708,161, Arnone, et al., filed May 8, 2015.
U.S. Appl. No. 14/708,162, Arnone, et al., filed May 8, 2015.
U.S. Appl. No. 14/710,483, Arnone, et al., filed May 12, 2015.
U.S. Appl. No. 14/714,084, Arnone, et al., filed May 15, 2015.
U.S. Appl. No. 14/715,463, Arnone, et al., filed May 18, 2015.
U.S. Appl. No. 14/720,620, Arnone, et al., filed May 22, 2015.
U.S. Appl. No. 14/720,624, Arnone, et al., filed May 22, 2015.
U.S. Appl. No. 14/720,626, Arnone, et al., filed May 22, 2015.
U.S. Appl. No. 14/727,726, Arnone, et al., filed Jun. 1, 2015.
U.S. Appl. No. 14/730,183, Arnone, et al., filed Jun. 3, 2015.
U.S. Appl. No. 14/731,321, Arnone, et al., filed Jun. 4, 2015.
U.S. Appl. No. 14/740,078, Arnone, et al., filed Jun. 15, 2015.
U.S. Appl. No. 14/742,517, Arnone, et al., filed Jun. 17, 2015.
U.S. Appl. No. 14/743,708, Arnone, et al., filed Jun. 18, 2015.
U.S. Appl. No. 14/746,731, Arnone, et al., filed Jun. 22, 2015.
U.S. Appl. No. 14/748,122, Arnone, et al., filed Jun. 23, 2015.
U.S. Appl. No. 14/788,581, Arnone, et al., filed Jun. 30, 2015.
U.S. Appl. No. 14/793,685, Arnone, et al., filed Jul. 7, 2015.
U.S. Appl. No. 14/793,704, Arnone, et al., filed Jul. 7, 2015.
U.S. Appl. No. 14/797,016, Arnone, et al., filed Jul. 10, 2015.
U.S. Appl. No. 14/799,481, Arnone, et al., filed Jul. 14, 2015.
Japan Patent Office, Office Action, Japan Patent Application No. 2015-040840, May 19, 2016, Japan.

\* cited by examiner

SYSTEMS FOR FLEXIBLE GAMING ENVIRONMENTS

CROSS-REFERENCE TO RELATED APPLICATION

The present application is a continuation of U.S. patent application Ser. No. 14/720,624, filed May 22, 2015 now U.S. Pat. No. 9,449,460 issued Sep. 20, 2016, which is a continuation of U.S. patent application Ser. No. 14/304,027, filed Jun. 13, 2014 now U.S. Pat. No. 9,039,536 issued May 26, 2015, which is a continuation of U.S. patent application Ser. No. 14/043,838, filed Oct. 1, 2013, now U.S. Pat. No. 8,753,212 issued Jun. 17, 2014 which is a continuation of U.S. patent application Ser. No. 13/872,946, filed Apr. 29, 2013, now U.S. Pat. No. 8,562,445 issued Oct. 22, 2013 which is a continuation of Patent Cooperation Treaty Application No. PCT/US12/40800, filed Jun. 4, 2012, which claims the benefit of U.S. Provisional Patent Application No. 61/519,981, filed Jun. 2, 2011, and 61/604,347, filed Feb. 28, 2012, the contents of each of which are hereby incorporated by reference herein.

FIELD

The present application concerns gaming, and more specifically to gaming over a communications network.

BACKGROUND

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage.

One form of distribution of typical video games is through the Internet. The video games are distributed and played on-line without concern for regulation, oversight or auditing. Nor is the distribution of a typical on-line video game organized to enable game play with a gambling component.

SUMMARY

In various embodiments of the invention, systems of a gaming environment multiplexer are provided. An embodiment includes a real world controller coupled to a gaming environment multiplexer, wherein the real world controller is constructed to provide a gambling game; and the gaming environment multiplexer coupled to the real world controller, wherein the gaming environment multiplexer is constructed to: receive from a game world controller via a network, a request for coupling the game world controller to the real world controller providing the gambling game; determine that the game world controller is approved for a regulatory regime; and couple via the network the game world controller to the real world controller, when the multiplexer determines that the game world controller is approved for the regulatory regime, whereby an entertainment game of an entertainment software controller associated with the gaming environment multiplexer is coupled to the gambling game of the real world controller, by the game world controller.

In a further embodiment, the gaming environment multiplexer is further constructed to determine that the entertainment software controller is approved for the regulatory regime, and the entertainment software controller is made available for coupling to the game world controller when the gaming environment multiplexer determines that the entertainment software controller is approved for the regulatory regime.

In a further embodiment, the gaming environment multiplexer is further constructed to determine that the real world controller is approved for the regulatory regime, and the real world controller is made available for coupling to the game world controller when the gaming environment multiplexer determines that the real world controller is approved for the regulatory regime.

In a further embodiment, the gaming environment multiplexer is further constructed to receive from the game world controller via the network a regulatory regime/tax tag for a regulatory inspection/action tracking module of the gaming environment multiplexer.

In a further embodiment, the gaming environment multiplexer is further constructed to receive from the entertainment software controller via the network, a regulatory regime/tax tag for a regulatory inspection/action tracking module of the gaming environment multiplexer.

In a further embodiment, the gaming environment multiplexer is further constructed to receive from the real world controller via the network a regulatory regime/tax tag for a regulatory inspection/action tracking module of the gaming environment multiplexer.

In a further embodiment, the game world controller and the real world controller are constructed from the same device.

An embodiment includes an entertainment software controller coupled to a gaming environment multiplexer, wherein the entertainment software controller is constructed to provide an entertainment game; and the gaming environment multiplexer coupled to the entertainment software controller, wherein the gaming environment multiplexer is constructed to: receive from a game world controller via a network, a request for coupling the game world controller to the entertainment software controller providing the entertainment game; determine that the game world controller is approved for a regulatory regime; and couple via the network the game world controller to the entertainment software controller, when the multiplexer determines that the game world controller is approved for the regulatory regime, whereby the entertainment game of the entertainment software controller is coupled to a gambling game of a real world controller associated with the gaming environment multiplexer, by the game world controller.

An embodiment includes a gaming environment multiplexer constructed to: receive from a game world controller via a network, a request for coupling the game world controller to elements of a hybrid game, the elements of the hybrid game comprising: an entertainment software controller providing an entertainment game for the hybrid game; and a real world controller providing a gambling game for the hybrid game; determine that the game world controller is approved for a regulatory regime; and couple via the network the game world controller to the entertainment software controller and the real world controller, when the multiplexer determines that the game world controller is approved for the regulatory regime, whereby the entertainment game of the entertainment software controller is coupled to the gambling game of the real world controller by the game world controller.

DETAILED DESCRIPTION

Turning now to the drawings, the drawings illustrate systems and methods for a flexible, dynamically configurable, method for connecting together modules or elements of a hybrid game having an entertainment game component and a gambling game component over a wide area network or the Internet, enabling the modules or elements of the hybrid game to dynamically connect, and then perform their functions, without having to be pre-compiled or integrated. Such systems and methods dynamically bring together modules or elements to create a gaming environment in conjunction with a game of skill in the context of a networked environment, such as the Internet.

Figure 1:
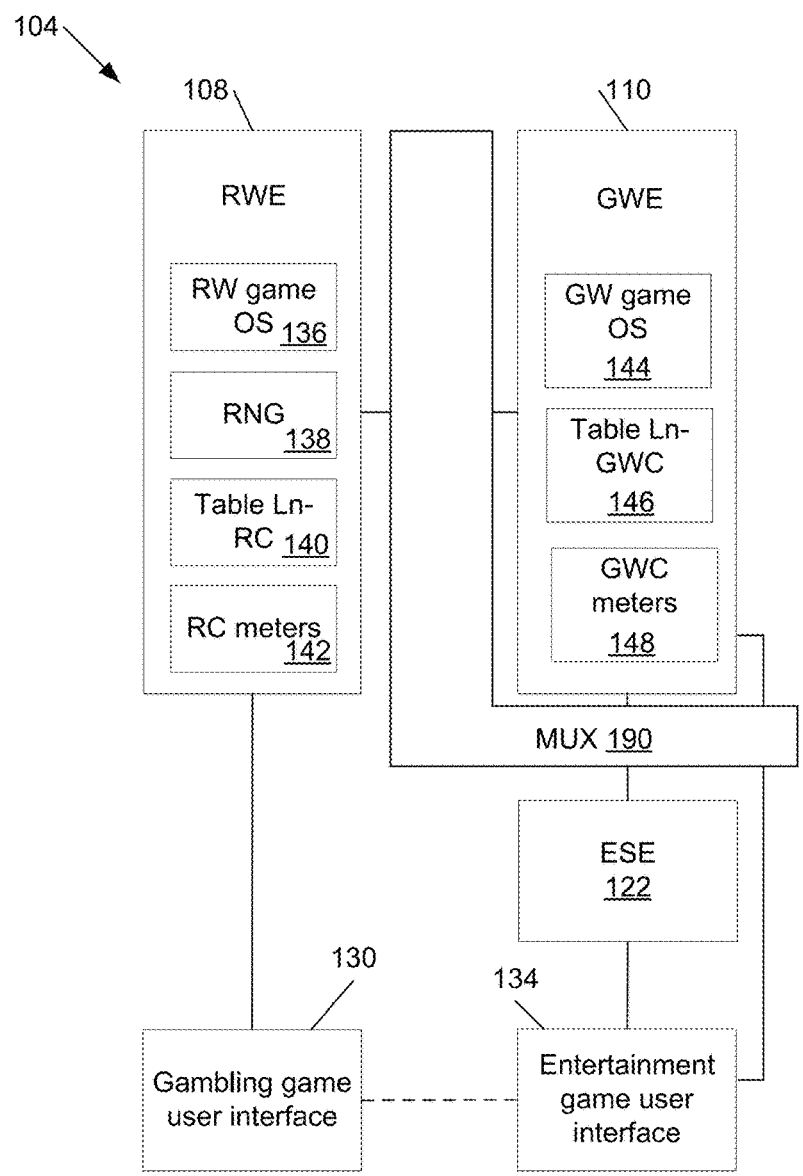
FIG. 1 is an illustration of a gaming environment in accordance with an exemplary embodiment.

FIG. 1 is an illustration of a system for interconnecting hybrid game modules or elements over a wide area network in accordance with an exemplary embodiment. In various embodiments, the system dynamically assembles one or more instances of a hybrid game. A hybrid game 100 is a game that integrates both a gambling game and an entertainment game. The hybrid game includes a real world engine 108 (RWE) module or element that manages the gambling portion of the hybrid game, a game world engine 110 (GWE) module or element that includes the hybrid game control logic portion of the hybrid game and manages an interface between the RWE and the entertainment portion of the hybrid game, and an entertainment software engine 122 (ESE) module or element that executes the entertainment portion of the hybrid game for user entertainment. A marketplace multiplexer (MUX) 190 operatively connects the GWE to the RWE and the ESE.

The GWE 108 manages ESE game world (GW) and RWE real world (RW) portions of the hybrid game, and includes the mechanical, electronic and software components used to implement the hybrid game control logic to perform various functions for the hybrid game. For example, various implementations of a GWE include the functions of: (a) coupling to an ESE to signal and provide controls of the GW portion of the game operating in the ESE, (b) including tables for determining game world credits (GWCs) and, if applicable, take input from this table to affect the play of the GW portion of the game, (c) coupling to an RWE to determine and amount of real credit (RC) available on the hybrid game and other metrics of wagering on the RW portion of the game, (d) potentially affect the amount of RC in play, pay tables, odds and other wager shaping factors in operation on the RWE, (e) providing various audit logs and activity meters, and (f) coupling to a centralized server for exchanging various data related to the player and their activities on the game.

The ESE 122 is a portion of a hybrid game that is an electronic and software system including the control logic that controls the playing of video games for entertainment. The ESE accepts input from a player through a set of hand, foot, body, mind and/or visual controls and outputs video, audio and/or other sensory output to a user interface. A Personal Computer (PC), Sony PlayStation® or Microsoft Xbox® running a specific game program (e.g. a version of Madden Football '10 or Call of Duty®) would be typical examples of an ESE. For the purposes of this disclosure, the ESE interfaces and exchanges data with and accepts control information from various components in a hybrid game, or a system of which the hybrid game is a part.

In certain embodiments, the hybrid game also includes a user interface associated with either or both the gambling game and the entertainment game. In many embodiments, an entertainment game is a skill, pseudo-skill or non-skill game, deterministic or interactive, operating on the ESE that provides an entertainment or informative sensory entertainment experience for the player.

In some embodiments, a hybrid game is form of game, designed for use in a physical or virtual casino environment, that provides players an environment in that to play for cash, prizes and points, either against the casino or in head-to-head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based game. In various environments, an interactive entertainment game is provided where skill and chance may coalesce to provide a rich arcade-style gaming experience, visually exciting and challenging, where players may wager cash, credits prizes and points in order to win more of the foregoing.

RWE 108 functions as an operating system for the gambling game of the hybrid game 104 and controls and operates the gambling game. The operation of a gambling game is enabled by real funds, accretes and declinates real gambling credits based on random gambling outcome, and whose gambling proposition is typically regulated by gaming control bodies. In many embodiments, the RWE 108 includes a real world (RW) operating system (OS) 136, random number generator (RNG) 138, level "n" real-world credit pay tables (table Ln-RC) 140, RC meters 142 and other software constructs that enable a game of chance to offer a fair and transparent gambling proposition, and to include the auditable systems and functions that can enable the game to obtain gaming regulatory body approval.

This is a table and/or algorithms that may exist, and may be used in conjunction with a random number generator to dictate the RC earned as a function of a wager proposition and is analogous to the pay tables used in a conventional slot machine. There may be one or a plurality of table Ln-Rc pay tables included in a game design.

In some embodiments, the RWE A portion of a hybrid game which operates the RC wagering aspects, and includes the mechanical, electronic and software aspects to perform the following non-exhaustive list of functions: (a) include or interface to an RNG and provide control of the RW portion of the game, (b) include table Ln-RC and to take input from this table to affect the wagering activity of the game, (c) couple to the GWE to communicate the amount of RC available on the game, (d) communicate other metrics of wagering and its status to the GWE, (e) accept input from the GWE as to the amount of RC to be wagered, (f) accept signaling from the GWE in order to trigger execution of an wagering play, (g) include various audit logs and activity meters, (h) couple to a centralized server for exchanging various data related to accounting of the wagering proposition, the player and their wagering activities on the game. Certain aspects of an RWE would be analogous to components within a slot machine.

A real world can be considered a physical world of which humans are a part, as opposed to the virtual game world. For the purposes of this disclosure, this may also be used in the context of the gambling or wagering portion of the game hybrid game (the RWE) which may or may not include an entertainment portion of its own, but whose fundamental operation is enabled by real funds, and which accretes and declinates real wagering credits and/or funds based on random wagering outcomes, and whose wagering proposition is typically regulated by gaming control bodies. For the purposes of this disclosure, the fundamentals of the mechanisms of play of a slot machine should be thought of as RW.

A random number generator (RNG) 138 includes software and/or hardware algorithms and/or processes that are used to generate random or pseudorandom outcomes. A level n real-world credit pay table (table Ln-RC) 140 is a table that can be used in conjunction with a random number generator to dictate the real world credits (RC) earned as a function of game play and is analogous to the pay tables used in a conventional slot machine. Table Ln-Rc payouts are independent of player skill. There may be one or a plurality of table Ln-Rc pay tables contained in a gambling game, the selection of which may be determined by game progress a player has earned, and bonus rounds, which a player may be eligible for. Real world credits (RC) are credits analogous to slot machine game credits, which are entered into a gambling game by the user, either in the form of hard currency or electronic funds. RCs can be decremented or augmented based on the outcome of a random number generator according to the table Ln-Rc real world credits pay table, independent of player skill. In certain embodiments, an amount of RC can be required to enter higher ESE game levels. RC can be carried forward to higher game levels or paid out if a game cash out is opted for by a player. The amount of RC required to enter a specific level of the game "level n" need not be the same for each level.

In many embodiments, the GWE 110 manages the overall hybrid game operation, with the RWE 108 and the ESE 122 effectively being support units to the GWE 110. In several embodiments, the GWE 110 contains mechanical, electronic and software system for an entertainment game. The GWE includes a game world (GW) game operating system (OS) 144 that provides control of the entertainment game.

In some embodiments, the GWE also manages game world credits (GWCs) that are player and/or game GW points earned or depleted as a function of a player's skill or player performance in the context of an entertainment (i.e. ESE) game. GWC is analogous to the "score" in a typical video game. Any given entertainment game may have a scoring criterion native to its makeup, and methods for utilizing this score in the context of the hybrid game may be embedded within a table Ln-GWC that reflects player performance against the goal(s) of the entertainment game. In some embodiments, GWC may be fungible between hybrid games, and may be carried forward from one level of game play to another in any given entertainment game. There may be one or more types of GWC present in a hybrid game. GWC may be ultimately paid out in various manners such as directly in cash and goods prizes, or indirectly such as consumed or benchmarked for earning entrance into a sweepstakes drawing, or earning participation in a tournament with prizes, or indirectly by purchases and redemptions within the GW entertainment game context. In many embodiments, GWC may be utilized to determine ranking of players, and winners in tournaments. In some embodiments, GWC may be attributed to a specific player or player's avatar in the GW, may be stored on a system under a player account for accumulation over time and retrieval, and/or may be stored on a card or other transportable media.

The GWE additionally contains a level "n" game world credit pay table (table Ln-GWC) 146 indicating where to take input from this table to affect the play of the entertainment game. The GWE can further couple to the RWE 108 to determine the amount of RC available on the game and other metrics of wagering on the gambling game (and potentially affect the amount of RC in play on the RWE 108). The GWE additionally contains various audit logs and activity meters (such as the GWC meter 148). The GWE can also couple to a centralized server for exchanging various data related to the player and their activities on the game. The GWE furthermore couples to the ESE 122.

In many embodiments, a level "n" game world credit pay table (table Ln-GWC) 146 dictates the GWC earned as a function of player skill in the nth level of the game. The payouts governed by this table are dependent upon player skill and game play at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each game has one or more scoring criterion, embedded within the table Ln-GWC 146 that reflects player performance against the goal(s) of the game. GWC can be carried forward from one level of game play to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In some embodiments, the operation of the GWE 110 does not affect the RWE's 108 gambling operation except for player choice parameters that are allowable in slot machines today, such as the wager amount, how fast the player wants to play (by pressing a button or pulling the slot's handle), agreement to wager into a bonus round, etc. In this sense, the RWE provides a fair and transparent, non-skill based gambling proposition co-processor to the GWE. In the illustrated embodiment, the communication link shown between the GWE 110 and the RWE 108 allows the GWE 110 to obtain information from the RWE 108 as to the amount of RC available in the gambling game. The communication link can also convey a necessary status operation of the RWE (such as on-line or tilt). The communication link can further communicate the various gambling control factors, which the RWE 108 uses as input, such as the number of RC consumed per game or the player's election to enter a jackpot round.

In FIG. 1, the GWE 110 is also shown as connecting to the player's user interface directly, as this may be necessary to communicate certain entertainment game club points, player status, control the selection of choices and messages which a player may find useful in order to adjust their entertainment game experience or understand their gambling status in the RWE 108.

In various embodiments, the ESE 122 manages and controls the visual, audio, and player control for the entertainment game. In certain embodiments, the ESE 122 accepts input from a player through a set of hand controls, and/or head, gesture, and/or eye tracking systems and outputs video, audio and/or other sensory output to a user interface. In many embodiments, the ESE 122 can exchange data with and accept control information from the GWE 110. In several embodiments an ESE 122 can be implemented using a personal computer (PC), a mobile device such as a smartphone, a tablet computer, a personal digital assistant, a Sony PlayStation® (a video game console developed by Sony Computer Entertainment of Tokyo Japan), or Microsoft Xbox® (a video game console developed by Microsoft Corporation of Redmond, Wash.) running a specific game program.

The ESE 122 operates mostly independently from the GWE 110, except that via their interface, the GWE 110 may send certain GW game control parameters to the ESE 122 to affect the entertainment game's play, such as (but not limited to) what level of character to be used, changing the difficulty level of the game, changing the type of game object, such as a gun or a car, in use, requesting potions to become available or to be found by the character, etc. The ESE 122 can accept this input from the GWE 110, make adjustments, and continue the play action all the while running seamlessly from the player's perspective. The ESE's 122 operation is mostly skill based, except for where the ESE's algorithm may inject complexities into the game by chance in its normal operation to create unpredictability in the entertainment game. Utilizing this interface, the ESE may also communicate player choices made in the game to the GWE 110, such as selection of a different gun, the player picking up a special potion in the GW environment, etc.

In other embodiments, operation of an entertainment game of a hybrid game by a player consumes one or more enabling modules or elements (EEs) within the entertainment game. An EE is a module or element that is consumed by, traded or exchanged in, operated upon, or used to enable the entertainment game portion of the hybrid game. There may be one or more types of EE present in the hybrid game's entertainment game. Examples of EE include bullets in a shooting game, fuel in a racing game, letters in a word spelling game, downs in a football game, potions in a character adventure game, character health points, etc. The GWE can associate consumption of an EE with the commitment or wager of RC to a gambling game of the hybrid game whereby commitment or wagering of the RC in the gambling game is coordinated with the consumption of the EE in the entertainment game because of actions of the player. Furthermore, the GWE can provide an increment or decrement of EE available to the player in coordination with the gambling outcome of the gambling game such as by incrementing the EE when RC is won or decrementing EE when RC is lost.

The GWE's job in this architecture, being interfaced thusly to the ESE, is to allow the transparent coupling of entertainment software to a fair and transparent random chance gambling game, providing a seamless perspective to the player that they are playing a typical popular entertainment game (which is skill based). In certain embodiments, the ESE 122 can be used to enable a wide range of games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.), etc.). Providers of such software can provide the previously described interface by which the GWE 110 can request amendments to the operation of the ESE software in order to provide the seamless and sensible operation of the hybrid game as both a gambling game and an entertainment game.

In several embodiments, the RWE 108 can accept a trigger to run a gambling game in response to actions taken by the player in the entertainment game as conveyed by the ESE 122 to the GWE 110, or as triggered by the GWE 110 based on the GWE's control logic, in the background to the overall game from the player's perspective, and can provide information to the GWE 110 to expose the player to certain aspects of the gambling game, such as (but not limited to) odds, amount of RC in play, and amount of RC available. The RWE 108 can accept modifications in the amount of RC wagered on each individual gambling try, or the number of games per minute the RWE 108 can execute, entrance into a bonus round, and other factors, all the while these factors can take a different form than that of a typical slot machine. An example of a varying wager amount that the player can choose might be that they have decided to play with a more powerful character in the game, or having a more powerful gun, a better car, etc. These choices can increase or decrease the amount wagered per individual gambling game, in the same manner that a standard slot machine player may decide to wager more or less credits for each pull of the handle. In several embodiments, the RWE 108 can communicate a number of factors back and forth to the GWE 110, via their interface, such as an increase or decrease in a wager being a function of the player's decision making as to their operational profile in the entertainment game (i.e. power of the character, gun selection, car choice, etc.). In this manner, the player is always in control of the per game wager amount, with the choice mapping to some parameter or component which is applicable to the entertainment game experience of the hybrid game. In a particular embodiment, the RWE operation can be a game of chance running every 10 seconds where the amount wagered is communicated from the GWE 110 as a function of choices the player makes in the operation profile in the entertainment game such as those cited above.

In many embodiments, a hybrid game integrates a video game style gambling machine, where the gambling game (i.e. RWE 108 and RC) is not player skill based, while at the same time allows players to use their skills to earn club points which a casino operator can translate to rewards, tournaments opportunities and prizes for the players. The actual exchange of monetary funds earned or lost directly from gambling against a game of chance, such as a slot machine, is preserved. At the same time, a rich environment of rewards to stimulate "garners" can be established with the entertainment game. In several embodiments, the hybrid game can leverage very popular titles with "garners" and provides a sea change environment for casinos to attract players with games that are more akin to the type of entertainment, which a younger generation desires. In various embodiments, players can use their skill towards building and banking GWC, which in turn can be used to win tournaments and various prizes as a function of their "garners" prowess. Numerous embodiments minimize the underlying changes needed to the aforementioned entertainment software (Gears of War, etc.), for the hybrid game to operate within an entertainment game construct, thus making a plethora of complex game titles and environments, rapid and inexpensive to deploy in a gaming environment.

In various embodiments, a system is provided that effects the integration of modules or elements allowing players to utilize a new type of slot machine game that operates on and/or accrues or consumes new forms of currency, one such currency being legal tender or script as real world credit (RC), another currency being game world credit (GWC), as the system integrates a traditional game of random chance playing for RC that functions in concert with a skill game playing for GWC.

In various embodiments, a hybrid game can be played by users on a wide area network, such as the Internet, through a website (e.g. Facebook®, addictinggames.com, bodog.com, etc.) or a dedicated application running on a computer such as an iPad, mobile phone, laptop, PlayStation®, or other computer device. In some embodiments, a flexible gaming environment organizes the various modules or elements into a system that can enable game play with a gambling component, allowing various combinations of the modules or elements (from one or more distinct entities) to be organized to achieve a specific player experience, while providing for regulation, oversight and auditing of a gaming businesses.

In some embodiments, to bring into effect an instance of a hybrid game on-line, a number of modules or elements are present. These include an entertainment software engine (ESE), that provides rich multi-media output of high entertainment value to the player, a game world engine (GWE), and a real world engine or (RWE).

In various embodiments, all of these modules or elements of a hybrid game can be present in a single physical game located on the floor of a casino. In other embodiments, each of these modules or elements (or a subset of them) can be distributed across servers that are not physically coincident. In some of these embodiments, these modules or elements can be dynamically organized, or put another way, mixed, to alter the implementation of the hybrid game in response to the desires of the player or the company or companies that control various embodiments of the value chain related to providing end users with a complete gaming experience while providing that regulatory and auditing requirements are met.

In some embodiments, the ESE, GWE and RWE can be resident on one or more computers and tied together inextricably (i.e. the software in each instance of the aforementioned modules or elements is programmed to connect to a specifically named module or element of each other) to provide the functionality necessary to implement the hybrid game. In this embodiment, regulating and auditing of the system is achieved through the functionality of the various modules or elements making up the hybrid game, and it is likely, though not necessary, that each of these functional modules or elements are under the control of a single entity that is effectively delivering the entire game experience to the end user. A real world (RW) and game world (GW) user interfaces could, for example, share a single window in a web-browser, or operate through separate windows in a web browser. In some embodiments, a game world includes an entertainment portion of a hybrid game and is made up of information typically associated with a virtual entertainment environment, including the hybrid game's visual and logical game space, game state, game characters, progress points and scores. For the purposes of this disclosure, typical games played on a gaming console, such as a Sony PlayStation®, or a PC could be thought of as in the GW.

They could also take the form of more freestanding web-enabled apps resident on a mobile device or other computer.

In other embodiments, the various functional modules or elements are not tied together inextricably but rather can be organized dynamically in response to commands from a control layer, thereby allowing a specific combination of ESE, GWE, RWE (and also potentially a game world credit exchange (GWCE)) to be organized dynamically in response to input provided from one or more parties (e.g. the player, the operator of the site through that the player interfaces to the game, a provider of gambling services, regulatory bodies, etc.). In some embodiments, this dynamic organization can be undertaken as often as every game session that is commenced by a player, or much less frequently (i.e. a web site operator, provider of gambling services, regulatory body, and/or other parties may establish a more "permanent" arrangement that persists across a fixed period of time).

Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety. The RWE, GWE and ESE are also discussed further below.

Figure 2:
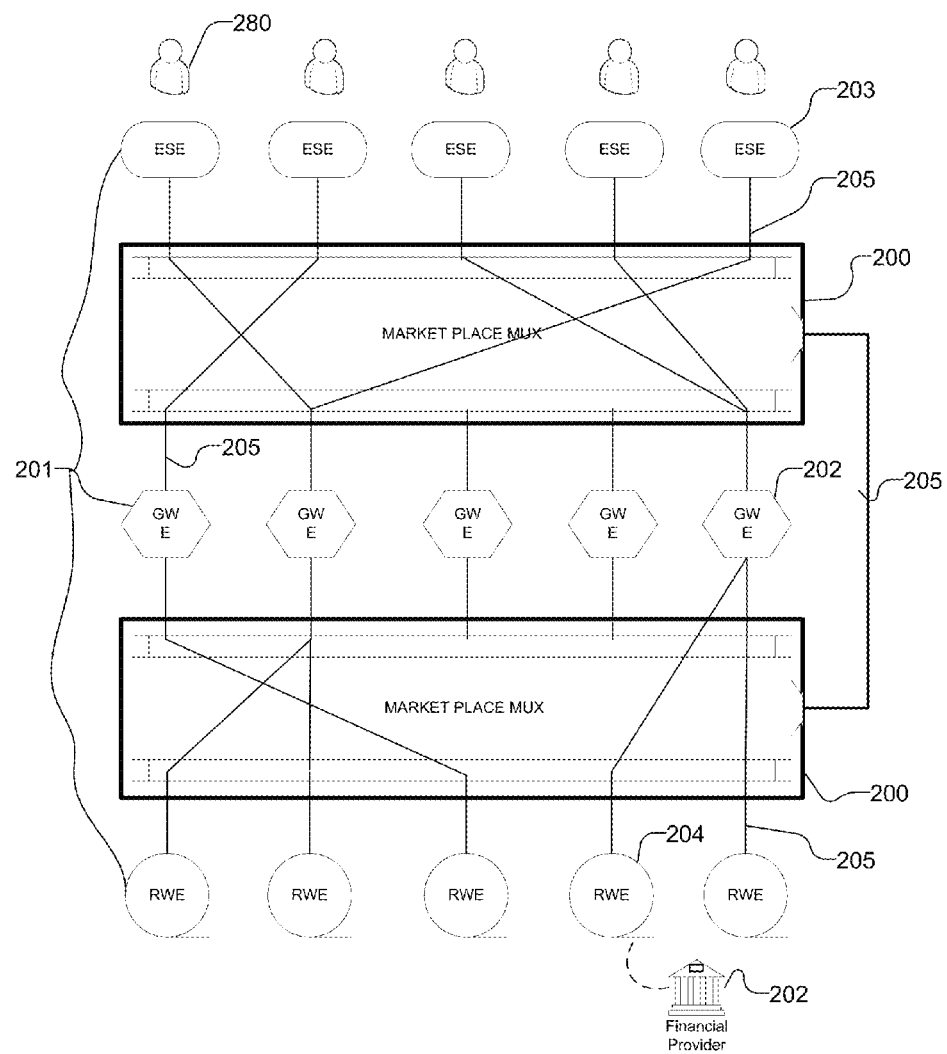
FIG. 2 is an illustration of a system for interconnecting a hybrid game modules or elements over a wide area network in accordance with an exemplary embodiment.

In FIG. 2, one or more of a plurality of ESEs 203, are operatively connected to a one or more of a plurality of GWEs 202, that in turn are operatively connected to one or more of a plurality of RWEs 204 by one or more marketplace multiplexers (MUXs) 200 over a wide area network, such as the Internet 205. Marketplace MUXs provide for the connection of the various modules or elements of a hybrid game so that a gaming session can be conducted. Any one of the ESEs can be connected one of a number of available GWEs, which then in turn connected to any one of a number of available RWEs, this function being conducted by the marketplace MUXs. It is also possible that a given GWE may connect to a plurality of ESEs, so that the features of the particular GWE can be exploited by a given ESE. It is also possible that a given RWE may serve a number of GWEs, depending on the connection arrangement. As can be seen in the figure, the marketplace MUXs enable the connection of the three hybrid game modules or elements (ESE, GWE, RWE) in a number of possible permutations, effectively dynamically assembling a hybrid game over a communications network such as the Internet where the various modules or elements could be literally located anywhere the Internet is available and it is lawful to play a hybrid game.

Also shown in FIG. 2 is a discrete financial institution 202, associated with one of the RWEs. It should be noted that in some embodiments, the provider of the RWE wagering engine might not be the same entity as that with that the player of a given ESE would have an account to support funds transfer so wagering could result. In many cases, however, the RWE operator and financial institution can be offered by the same entity, and further, the RWE and financial institution may even operate on the same server. The dashed connection line in the figure between the RWE and the financial institution 202, might be a direct LAN, WAN, Internet connection or some other method for connecting the two systems/servers.

In some embodiments, the financial institution can be directly or indirectly accessed by the player without interfacing through the various hybrid game modules or elements or marketplace MUXs, with the player then transferring funds, credits or a line of credit into the hybrid game environment. Also depicted in FIG. 2 is the one or more marketplace MUXs being interfaced to each other over the communication network such as the Internet for the purposes of control, status and data exchange to enable the dynamically assembled hybrid games.

The dynamic environment of FIG. 2 allows a plurality of ESE modules or elements, inclusive of the entertainment game content they support, to be linked to 1 of N GWE modules or elements through the marketplace MUX shown in the figure. The GWE modules or elements, in turn, can be linked to 1 of Q RWE modules or elements through the same or another marketplace MUX. The connections between various modules or elements can be made and broken as frequently as each gambling session, though they can also be relatively persistent in nature. For example, a game provider can select a specific implementation of the GWE to plug into their ESE in such a way that the connection is not open to change as a function of a player's interaction with the system. As another example, a game provider may be a person or entity which operates one or more operations, including but not limited to a WAN gaming franchise, a website or websites, and/or provides applications for internet enabled computer devices, each providing a means by which players can interface with their entertainment games, and thus inevitably, hybrid games. The game provider and the casino can be the same entity, but need not be. In many embodiments, the game provider can select a specific instance of an RWE to provide the gambling game functionality to complete the system. The protocols and signaling used to connect to (and thus be gated by) the marketplace MUXs and similarly the ESEs, GWEs and RWEs, can be standardized to ensure interoperability. In some embodiments, a plurality of marketplace MUXs 200, each provide connectivity to a community of authorized hybrid game modules or elements, and these various marketplace MUXs are capable of interconnecting to one another, or embodiments where a single marketplace MUX would be capable of interconnecting all three of the hybrid game modules or elements (ESE, GWE, RWE).

In many embodiments, the plurality of RWEs shown in FIG. 2 may each be under the control of a different regulatory body, and each may have its own regulatory regime, such as a regime associating each hybrid game module or element with a specific regulatory body that is entitled to govern that module or element's functionality. The regulatory regime may also contain a set of parameters that govern behavior of the RWE with which it is associated in accord with the regulatory environment in question. For certain modules or elements it is possible that the regulatory regime contains a null set, that is, the hybrid game may not need to be regulated. Accordingly, the architecture illustrated in FIG. 2, allows entertainment games of hybrid games to be played by players subject to a number of different regulatory jurisdictions.

The system of FIG. 2 provides also for various types of ownership of, or control of each of these modules or elements from a business perspective. Operational control can be manifested in a number of ways, all of that are supported by the system of FIG. 2. For example, the same entity could control ESE, GWE and RWE modules or elements, or one entity could control an ESE and a GWE module or element while interfacing with an RWE module or element owned and operated by another party. Conversely, the ESE, GWE and RWE modules or elements could be operated by different independent entities. Also, the various marketplace MUXs could be owned and operated by another entity that provides the infrastructure for operation of hybrid games.

In some embodiments, the marketplace MUXs, and their ability to interconnect, enable fluid marketplaces through which the various modules or elements are interconnected to dynamically form hybrid games. In many embodiments, the GWE and RWE modules or elements are characterized in the marketplace, allowing them to be discovered and interconnected to each other and further to ESE modules or elements. In addition to the technical characteristics of the RWE and GWE that are described (for example, the characteristics of the gambling proposition for each RWE, any player club considerations, etc.), the economic rents charged by the owners of each module or element are defined in the marketplaces, so that entities interconnecting modules or elements understand the economic rents they will have to pay. Fees and charges may or may not then be exposed to players of the ESE entertainment games by the game providers.

In some embodiments, a given entertainment video game operating on a plurality of ESEs can be interfaced with more than one GWE, and that a given GWE can be interfaced to more than one RWE. A single session with which a specific player interacts, will only include one of each module or element, but from a systems view (as opposed to a single session view), a given video game operating on an ESE and GWE combination can be interacting with a number of RWEs at the same time, each within a different session.

The ability to dynamically arrange the various hybrid game modules or elements over the Internet or a WAN enables a number of functions in the architecture. In some embodiments, a popular, commonly available entertainment game, acting as the ESE of a hybrid game, can be played on an iPad for instance, and depending on what is legally allowable, dynamically connect to other modules or elements of a hybrid game over the Internet, thereby efficiently porting the hybrid game to the mobile environment.

In many embodiments, RWEs (and/or financial institution credit for players) can be provided by traditional land base casino operators, allowing players to play the game in the context of a specific player club at a property they frequent.

In various embodiments, the wagering proposition associated with a particular entertainment game, can be altered by selecting a different GWE/RWE combination, so as to fit a specific player's profile, budget, self-imposed constraints and casino-imposed constraints.

In some embodiments, various regulatory and legal requirements of different jurisdictions can be satisfied for the same entertainment game, across the breadth of jurisdictions, but only enabling connection to a particular GWE/RWE combination.

In many embodiments, ESE entertainment game providers can outsource the provisioning of RWE services to existing casino operators.

In various embodiments, a player can change the volatility and playability (i.e. the rate of variation of wins, and the size of the wins) of a particular entertainment game (running on the ESE), simply by selecting a different GWE/RWE combination. This is because the wagering and game world engine rules engines could be different between each combination, changing the "feel" of the game. An example of this might be: Frogger® brought to you by Xcite! vs. playing Frogger® Engage. Xcite! and Engage in this example would be different providers of a GWE/RWE combination to that the Frogger® game was linked by the architecture described in this disclosure.

In some embodiments, a market can be made for RWE services, whereby casinos compete to provide the RWE services to game providers. Similarly a market can be made whereby game providers compete to have their games associated with particular casino operators.

In many embodiments, game providers can readily enable their entertainment games or video games to become hybrid games or design games specifically for this purpose.

In various embodiments, regulators can establish jurisdiction over on-line gambling through regulation of casino operators In some embodiments, players can interface with reputable casinos they know have the proper financial backing and controls, and are trusted by regulatory authorities.

In many embodiments, specialization between the game providers and casinos is afforded, benefiting all economic participants and reducing litigation and market overlap.

In various embodiments, new providers can brought on line easily by the marketplace MUXs exporting an interface to the prospective provider whose system (ESE, GWE or RWE) complies with the interface, the offering validated, and then enabled on-line.

In some embodiments, a system can be implemented in a context other than the Internet. The construct described herein can also be used, for example, within a single casino, such that users access a plethora of games through terminals on the casino floor, and the various modules or elements of the hybrid game are dynamically combined using the systems and methods described herein to provide a broad range of gaming experiences to the player. In many embodiments, the architecture can span multiple casino floors, multiple casinos owned by a single property group, multiple casinos spanning multiple property groups and potentially multiple regulatory jurisdictions, etc. In short, the described architecture allows hybrid games to be dynamically organized in response to a range of inputs and conditions on the Internet, land-based casinos or other venues (real or virtual) where gaming takes place.

In various embodiments, an ESE 203 interfaces directly to an RWE 204 without requiring connection to a GWE 202 in the matrix. Such an implementation allows more traditional non-skill gaming games (such as a virtual slot machine, etc.) operating on the ESE to link flexibly in the same manner afforded by the MUX to various RWE's and financial institutions in a variety of regulatory regimes or locations.

In some embodiments, the architecture of FIG. 2 operates with just a GWE 202 connected to an ESE 203 through the MUX 200, allowing for non-wagering models where portions of the credit flows associated with a hybrid game could be accommodated, without the presence of RC. Such an implementation can also be useful for wagering models where post-processing of the session occur at a different time or physical or virtual location.

There are many possible permutations of how a hybrid game could be dynamically assembled. Other embodiments might include a version where the marketplace MUXs are included within one of the primary modules or elements, GWE, ESE and/or RWE, or instances where only a portion of the architecture has been implemented. In some embodiments, portions of the dynamically assembled hybrid game and/or its MUXs are located partially within the confines of a land based casino, and other portions existing in the cloud. Other permutations may be an ESE running on a terminal in the casino, accessing other portions of the architecture via WAN or the cloud.

Figure 3:
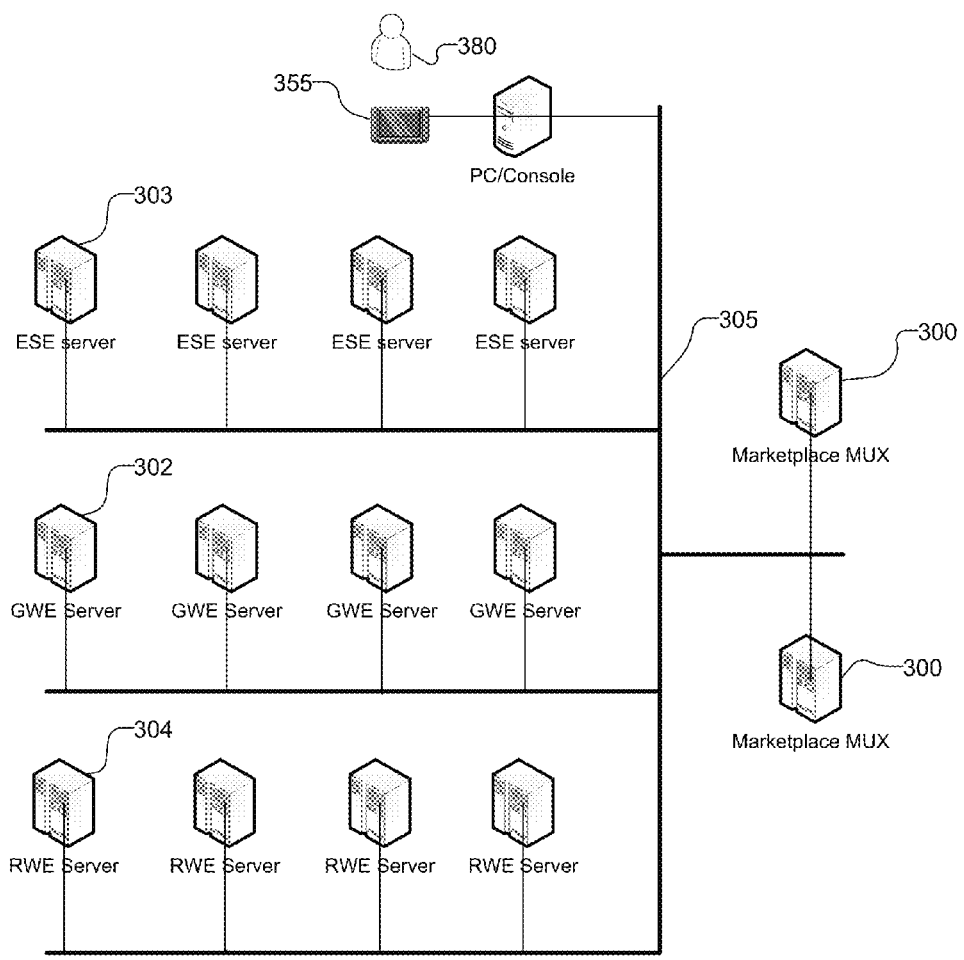
FIG. 3 is an illustration of a cloud-based system for interconnecting a hybrid game modules or elements over a wide area network in accordance with an exemplary embodiment.

FIG. 3 is an illustration of the architecture of FIG. 2 in a cloud-based solution. Shown are a plurality of various hybrid game modules or elements, GWE 302, ESE 303 and RWE 904, interconnected in the cloud. Also pictured are one or more marketplace MUXs 300. In this configuration, the various modules or elements subscribe to the marketplace MUXs that control the connection of the various modules or elements to other modules or elements in order to dynamically construct hybrid games. Control of the spawned environment can be under one or more of the marketplace MUXs, which would permit connection between the hybrid game module or element servers (ESE, GWE, RWE) in various combinations based on various rule engines and algorithms resident in the MUXs.

Figure 4:
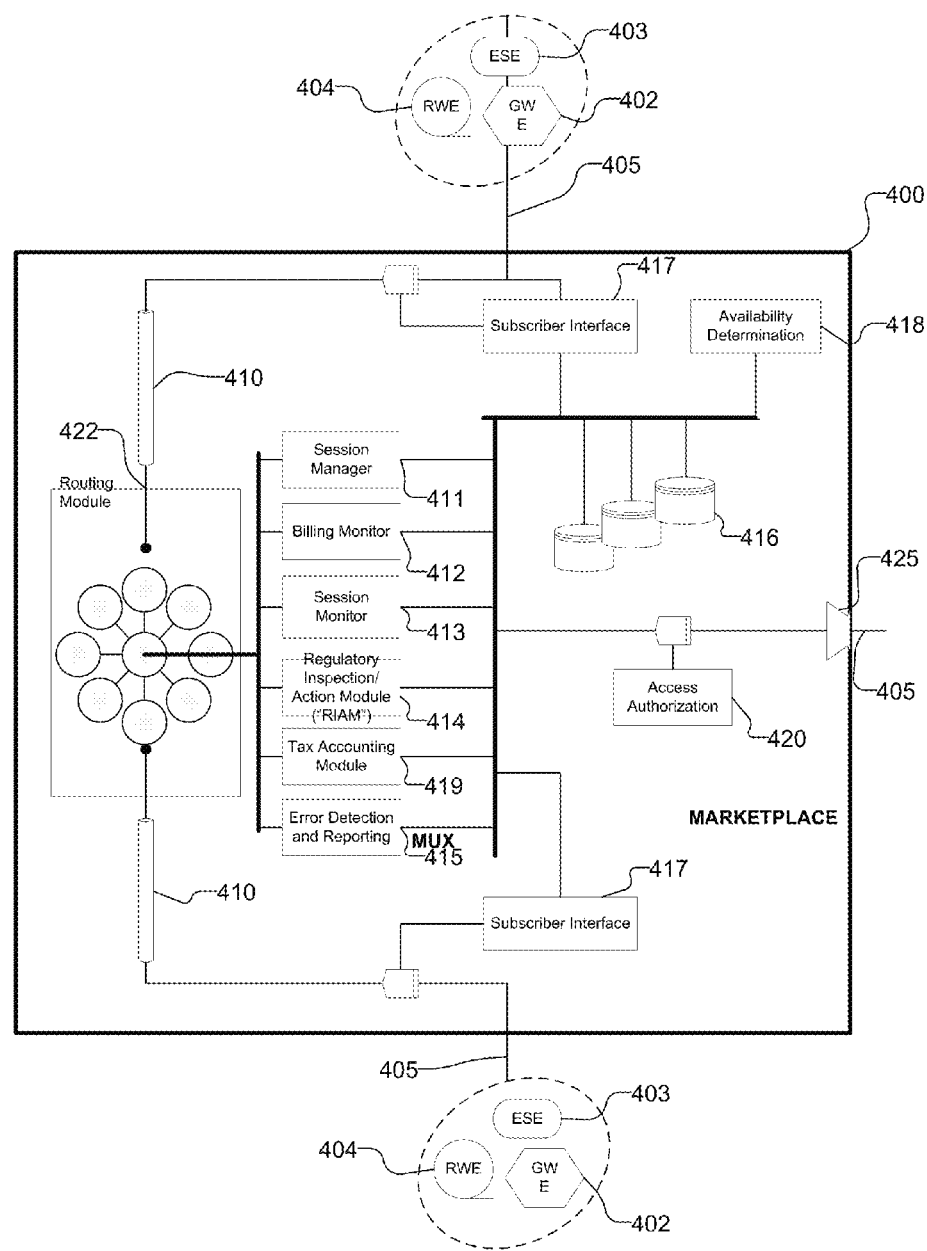
FIG. 4 is an illustration of a marketplace MUX in accordance with an exemplary embodiment.

FIG. 4 illustrates the inner workings of an exemplary marketplace MUX 400 and can be thought of as the operating system (OPS). The OPS is comprised of a number of internal modules or elements and modules or elements that are responsible for the routing and management of data that flows through the MUX. In the diagram, one or more of an ESE 403, GWE 402 or RWE 404 are operatively connected to the MUX via the Internet 405. Making up the OPS are a subscriber interface 417, that serves the role of facilitating connection of hybrid game modules or elements and provides connection authorization and approvals of the module or element connecting to the MUX. The subscriber interface enables parties to interact with the MUX to manage the modules or elements they have made available to the market, and to access various reports as to the utilization of modules or elements and the attendant economics associated with that use. An availability determination module or element 418 is coupled to the subscriber interface, determines the availability of the MUX for the requested use, and the MUX's ability to connect to the other requested hybrid game module or element and signals the subscriber interface so it may permit or reject the requested connection. A routing module or element 422 handles the creation of the interconnections for a hybrid game session between the various modules or elements. Once a connection is created/allowed by the routing module or element, a virtual channel 410 is established so that traffic may flow between hybrid game modules or elements. A number of modules or elements in the MUX rely on inspection of the virtual traffic channel, namely the session manager 411 whose job it is to manage the individual session, the billing monitor 412 that serves to track billing for the sake of billing and charging the player, the session monitor 413 that monitors the live session traffic to harvest information necessary for the MUX to manage record keeping and real time session monitoring, a tax accounting module or element 419 for auditing, assessing and assigning tax distribution for the hybrid game play based on point of play, point of operator and possibly point of server farm, and a regulatory inspection/action tracking module or element (RIAM) 414 that monitors traffic and other parameters to ensure regulatory compliance. In many embodiments, all of the modules or elements described also have access to various database and storage facilities 416 available for the MUX. The MUX also has a control interface 425 that allows the MUX to be programmed and configured, report status and for the MUX to communicate with other MUXs, taxing authorities, regulatory authorities, and other entities with that it is authorized to communicate. In some embodiments, the control interface 425 can also be used by the controlling or owning party of the MUX to accomplish a number of control functions, including various audit functions, and a number of other functions supported by the control interface, including authorizing a subscriber's ability to connect and conduct business through the MUX. In further embodiments, access to the internal OPS modules or elements can be controlled by an access authorization module or element 420 to ensure that only authorized parties may access the MUX.

Figure 5:
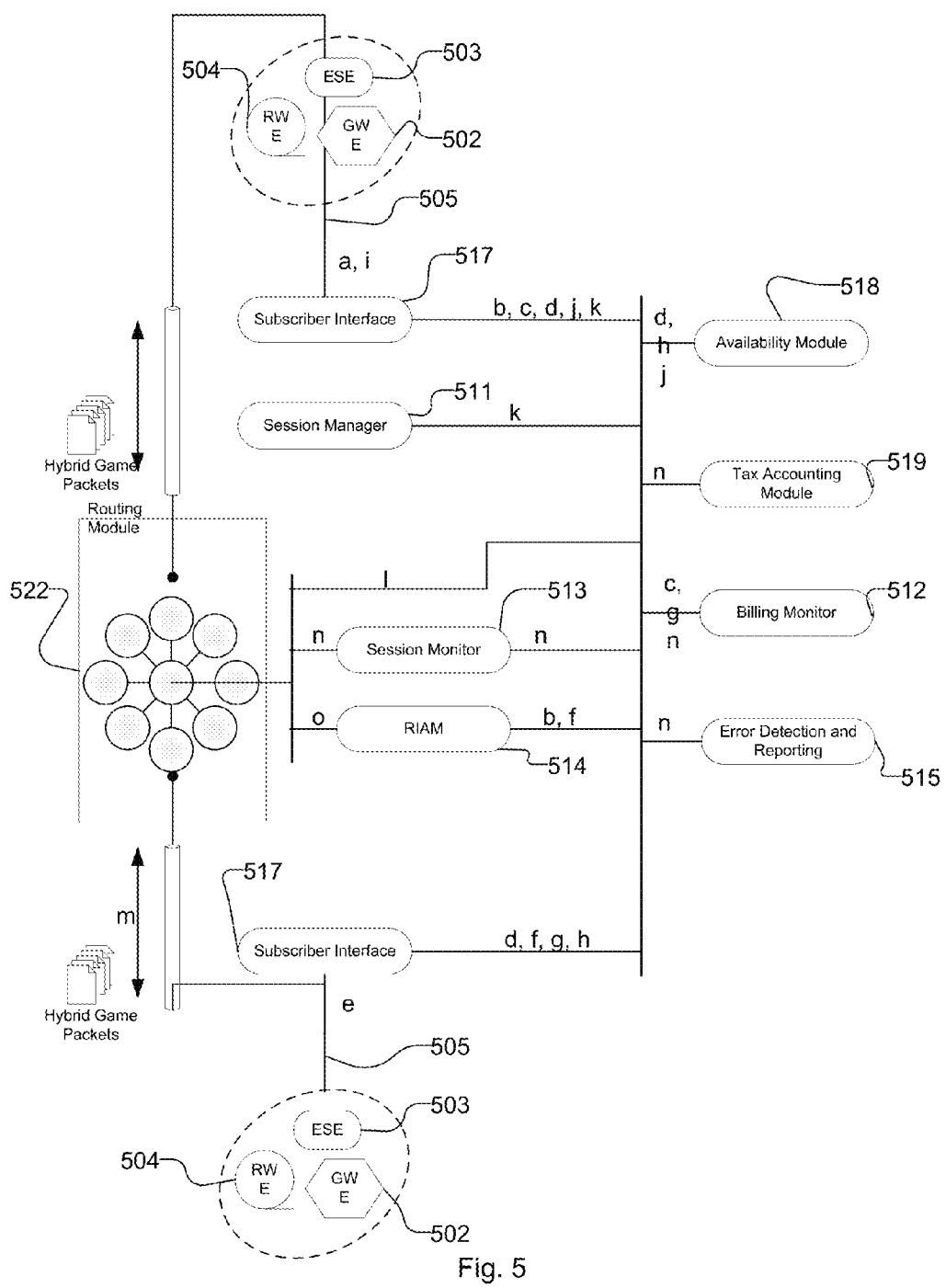
FIG. 5 is an illustration of a set of data flows, signaling and information exchange between various modules or elements of a marketplace MUX in accordance with an exemplary embodiment.

FIG. 5 illustrates one exemplary set of data flows, signaling and information exchange between the various modules or elements of FIG. 4. The table below describes this based on the labeled stages in the diagram.

TABLE 1

Marketplace MUX ("MUX") operation

| | |
|---|---|
| a | An ESE 503 connects to the MUX so as to inevitably request connection to other modules or elements of a hybrid game. The subscriber interface 517 exports an interface to the ESE over the internet 505, or in some other manner signals the ESE as to the method to connect to the MUX. These two modules or elements handshake and establish a connection. |
| b | The subscriber interface 517 checks with the regulatory inspection/action module or element ("RIAM") 514 to determine if the ESE 503 is an approved provider for the particular regulatory regime, and if so, signals approval of the ESE to connect. If the ESE were not approved, the subscriber interface would terminate the connection. |
| c | The subscriber interface 517 checks with the billing monitor 512 to determine if the particular ESE 503 is associated with an account with the MUX, or if one is required for billing for services or for handling money transfer/cross-billing for the play session through the MUX. The billing monitor may be requested to establish an account for the session. |
| d | Assuming approval in step c above, the subscriber interface 517 signals the availability module or element 518 that the particular ESE 503 is now available for connection through the MUX to other hybrid game modules or elements. |
| e | A GWE 502 connects to the MUX so as to inevitably connect to other modules or elements of the hybrid game. The subscriber interface 517 exports an interface to the GWE over the internet 505, or in some other manner signals the GWE as to the method to connect to the MUX. These two modules or elements handshake and establish a connection. |
| f | The subscriber interface 517 performs the same regulatory regime check as in step b, except it is for the particular GWE 502 |
| g | The subscriber interface 517 performs the same billing monitor 512 check as in step c, except it is for the particular GWE 502 |
| h | The subscriber interface 517 signals the availability module or element 518 that the particular GWE 502 is now available for connection. |
| i | The ESE 503 requests of the subscriber interface 517 that it wishes to connect through the MUX to a particular GWE 502. |
| j | The subscriber interface 517 requests availability of the particular GWE 502 from the availability module or element 518, which responds that it is available for connection. |
| k | The subscriber interface 517 signals the session manager 511 that to open a communication session between the particular ESE 503 and the GWE 502. The session manager maintains control over the link and determines the duration of the connection, and may induce filtering on some aspects of the communications. In some embodiments, it is constructed could allow communications with |

TABLE 1-continued

Marketplace MUX ("MUX") operation

| | |
|---|---|
| | the ESE and GWE so that either hybrid game module or element could elect to sever the connection. |
| L | The session manager 511 signals the routing module or element 522 to open a virtual pipe between the two hybrid game modules or elements, ESE 503 and GWE 502 so that they may directly communicate. |
| m | The pipe is established by the routing module or element 522 and hybrid game data packets flow between the ESE 503 and the GWE 502. |
| n | The session monitor 513 is responsible for monitoring the data exchanges and supplying applicable data in either the original form or a secondary form to the tax accounting module or element 519 whose responsibility it is to account for the session for tax assessment, the billing monitor 512 whose responsibility it is to bill for services of the MUX and cross bill and/or transfer funds or credits between the connected hybrid game components, and the error detection monitor 515 whose responsibility it is to monitor the channel for errant or out of bounds data behavior. |
| o | The RIAM 514 whose role it is to monitor that the hybrid game, its participant(s), the funds exchanged, and the location of the hybrid game modules or elements (ESE, GWE and RWE) meet the regulatory regime. Additionally, in some embodiments, the RIAM can scan hybrid game session packets for cheating whether it be: player performance exceeding their rated capabilities (handicap), extraordinary ESE game performance as could be enabled by "cheats", suspected illegal teaming up of players in community games, etc. |

The data flow, sequence and module or element descriptions in the table above are provided as an example of one exemplary method by which the marketplace MUX 500 operates, and is not intended to be exhaustive. A number of permutations of data flows and sequences of the MUX are possible. In many other embodiments, various other communications are possible, such as a GWE 502 seeking to connect to an ESE 503, an ESE 503 connecting to an RWE 504 without connecting to a GWE 502, a GWE 502 connecting to an RWE 504, an ESE 503, a GWE 502 and an RWE 504 all connecting to one another, or the RIAM 514 deriving its tap and information from the Session Monitor 513 and/or other modules or elements and segments of the MUX In many embodiments, the ESE 503, passes a request through a marketplace MUX 500 to the GWE 502 to connect through another marketplace MUX to a particular RWE 504, including specific indication of a particular financial institution 202 (FIG. 2) with which the player has an account, from which to draw credit or funds from to fund the hybrid game session. Account authorizations, funds and other data would then flow from the financial institution, directly or indirectly through the RWE to the second marketplace MUX where information could be loaded into the billing monitor module or element 512, and then further transmitted up to the first marketplace MUX either directly through the MUX control interface 525, or indirectly through the GWE, to be utilized in the marketplace MUX's billing monitor module or element 512, and further flowing up through the first marketplace MUX to the ESE, where account status, funds release and authorizations could take place for transmission back down through the stack described hereto to the financial institution 502 and the other waypoints of the FIG. 2 architecture through which said financial and account data flows.

In some embodiments, in managing the aforementioned marketplaces, the MUXs can also act to regulate traffic (i.e. interconnections) between modules or elements to reflect the capacity available by the provider of the module or element(s) in terms of data flows, economic constraints, number of games that can be simultaneously supported, regulatory limits, etc.

In many embodiments, the hybrid game modules or elements (GWE, ESE, RWE) offered for interconnect in the marketplace adhere to standards as relates their function and the data flows they support.

In various embodiments, the regulator inspection/action module or element (RIAM) 514 allows approved regulatory bodies to monitor processes within the MUX real-time, and to access data (session, billing, etc.). This module or element also allows the regulator to take action to eliminate or restrict certain modules or elements from the marketplace, to disconnect modules or elements from the MUX in real time, to establish rules that can shape which modules or elements can and cannot be interconnected, to alter the nature and frequency at which data is placed into the data store, etc. In short, the RIAM can supervise all aspects of the MUX's behavior while overseeing/monitoring the performance of individual modules or elements. There can be more than one instance of the RIAM such that one can be used, for example, as a control layer by the operator of the MUX, and others more of a monitoring and auditing function tied to a specific gaming session or sessions (i.e. combinations of an ESE, GWE, RWE module or element delivering a hybrid game experience to a player). In such cases, a hierarchy for the modules or elements can be established such that the actions initiated through the module or element with higher standing supersede those of the lower level RIAM.

In other embodiments, the RIAM 514 and/or the tax accounting module or element 519 within each MUX may also provide functionality to establish taxes due and payable to various governmental and regulatory authorities as a function of the location and/or nature of the parties involved in providing and playing the hybrid game and the funds spent or stored in conjunction with player game play and/or a player's account. These modules or elements operating within the marketplace MUX may also interface with their compliments (RIAM and tax accounting module or element) within the same or another marketplace MUX to provide end-to-end support of regulatory and tax requirements and may provide this information directly to the Game Providers, entities operating the MUXs and/or hybrid game modules or elements, and regulators. The communication link between these OPS modules or elements within the MUXs may be through the control interface 525, or specialized packets injected into the hybrid game steam of data running in the virtual pipe between the MUXs for the hybrid game session.

In still further embodiments, the various OPS modules or elements of FIG. 4 communicate with other OPS modules or elements in other MUXs 500, the system as a whole can support a secure packet communication methodology between all functional modules or elements and modules or elements and a prioritization of messages by type. Varying levels of security can be used depending upon the nature of the communication between modules or elements of the system. For example, communications between RIAMs 514 might have higher priority and higher level security than would communications through the subscriber interface indicating module or element availability. The use of a packet-based communication methodology, working in concert with the flexibility of the MUX architecture for hybrid games, allows one to flexibly add jurisdictions and additional MUX and RIAM layers in the future without having to spawn whole new communications channels. Effectively, the infrastructure allows, for example, a regulatory body to "subscribe" to the pre-existing network.

In some embodiments, RIAM 514 and/or tax accounting module or element 519 oriented data packets can be attached to each transaction (meaning a game session or portions thereof on a hybrid game) so that the regulatory and taxing records and controls flow seamlessly through the same virtual pipe established to dynamically link together a hybrid game.

In many embodiments, the one or more marketplace MUXs 500 operate as GWE MUXs. In addition to providing a market by which parties decide what specific instances of each type of module or element are interconnected, each GWE MUX acts as a router, managing the traffic between modules or elements. In performance of its duties as a router, the GWE MUX also receives messaging from the interconnected modules or elements and tracks the economic rents incurred as a result of each interconnect. Billing processes within the GWE MUX manage payments between the participants in the GWE MUX (i.e. the parties that control/own modules or elements) and extracts economic rents for the operator of the GWE MUX itself. When the interconnection between modules or elements needs to be terminated (at the end of a single session, after a definitive period of time, or until such time as a command to disconnect the modules or elements is received from one or more of the module or element's controlling entities) this process is affected by the GWE MUX.

In some embodiments, a market module or element controls how parties make modules or elements available for access to other modules or elements, and where the parties that own modules or elements describe their characteristics. Modules or elements offered for interconnection in the marketplace adhere to standards as relates their function and the data flows they support. In many embodiments, MUXs would also support two additional interfaces, a control interface and subscriber interface. The control interface would be used by the controlling or owning party, to accomplish a number of control functions, including authorizing a subscriber's ability to connect and conduct business through the MUX. The control interface is an instance of a RIAM. Various audit functions, and a number of other functions would be supported by the control interface. The subscriber interface would enable parties to interact with the MUX to manage the modules or elements they have made available to the market, and to access various reports as to the utilization of modules or elements and the attendant economics associated with that use.

In many embodiments, the OPS portion of the MUX, shown in FIG. 5, routes data between modules or elements that have been interconnected through the market. OPS also controls sessions (i.e. establishes, terminates) between modules or elements, tracks data to support billing functions and does all this in the context of the capacity constraints associated with each module or element. Error reporting and management is also a supported function within the OPS, ensuring that modules or elements experiencing technical difficulties are taken off-line and that the other modules or elements (and end users) ultimately connected to them are protected against negative impacts (e.g. lost data, lost currency) as a function of such errors.

In some embodiments, a data store stores records of each session along with billing data, and data desired by regulators for regular or random inspection.

In many embodiments, the RIAM allows approved regulators to monitor processes within the MUX real-time, and to access data (session, billing, etc.). This module or element also allows the regulator to take action to eliminate or restrict certain modules or elements from the marketplace, to disconnect modules or elements from the MUX in real time, to establish rules that can shape which modules or elements can and cannot be interconnected, to alter the nature and frequency at which data is placed into the data store, etc. In short, the RIAM can supervise aspects of the MUX's behavior while overseeing/monitoring the performance of individual modules or elements. There can be more than one instance of the RIAM such that one can be used, for example, as a control layer by the operator of the MUX, and others more of a monitoring and auditing function tied to a specific gaming session or sessions (i.e. combinations of an ESE, GWE, RWE module or element delivering a hybrid game experience to a player). In such cases, a hierarchy for the modules or elements can be established such that the actions initiated through the module or element with higher standing supersede those of the lower level RIAM.

In various embodiments, the RIAM within each MUX may also provide functionality to establish taxes due and payable to various governmental and regulatory authorities as a function of the location and/or nature of the parties involved in providing and playing the hybrid game and the funds spent or stored in conjunction with player game play and/or a player's account. A RIAM operating within a marketplace MUX may also interface with a RIAM within another marketplace MUX to provide end-to-end support of regulatory and tax requirements and may provide this information directly to the game providers, entities operating the MUXs and/or hybrid game modules or elements, and regulators.

In many embodiments, the system as a whole supports a secure packet communication methodology between all functional modules or elements and modules or elements, such that RIAMs in the stack can communicate with each other over the same network or methods as hybrid game modules or elements communicate with each other through MUXs, and with MUXs directly. In some embodiments, varying levels of security can be used depending upon the nature of the communication between modules or elements of the system. For example, communications between RIAMs might have higher level security protections than would communications through the subscriber interface indicating module or element availability. In various embodiments, the use of a packet-based communication methodology allows one to flexibly add jurisdictions and additional MUX and RIAM layers in the future without having to spawn whole new communications channels. Effectively, the infrastructure allows, for example, a regulatory body to "subscribe" to the pre-existing network. In some embodiments, RIAM oriented data packets could be attached to each transaction (meaning a game session on a hybrid game) so that the regulatory (and taxing) requirements flow seamless through the same infrastructure system. It also allows the layering and organization of RIAMs, MUXs and hybrid game modules or elements, as well as heretofore unforeseen functional modules or elements to be dynamically organized.

Figure 6:
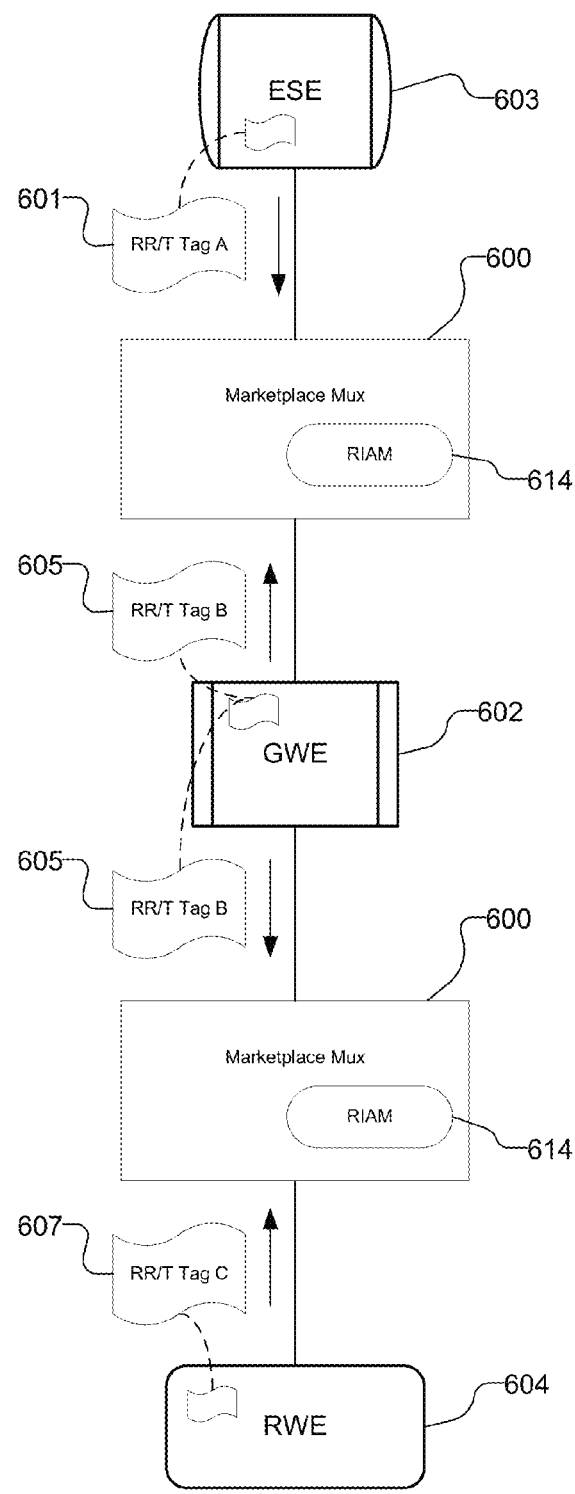
FIG. 6 is an illustration of the operation of a regulatory regime/tax (RR/T) tag in accordance with an exemplary embodiment.

FIG. 6 is an illustration of the operation of a regulatory regime/tax (RR/T) tag in accordance with an exemplary embodiment. Each module or element or module or element of a hybrid game has associated with it a regulatory regime. Acting as a "tag", the regulatory regime serves to inform the one or more RIAM(s) 614 of one or more marketplace MUXs 600 as to the appropriate rules and access required to oversee the performance of the module or element in question. It is possible that the regulatory regime for a given module or element is the "null set" in the case where no regulatory oversight is required and/or provided.

A RIAM is able to access the regulatory regime of each hybrid game module or element (RWE 604 GWE 602, ESE 603) and uses information from that regulatory regime to shape its function. For example, it may not be permissible to interconnect modules or elements with a particular regulatory regime with modules or elements that are not regulated, or that are regulated by an authority that is unacceptable to the regulator of another module or element or modules or elements.

The RR/T includes at least an identifier of a regulatory regime under which a respective module or element or module or element of a hybrid game is regulated. Accordingly, the RR/T serves to inform the RIAM(s) of each MUX as to the appropriate rules, tax regimes and access required to manage the accounting and performance of the module or element in question. In FIG. 6, there are the three hybrid game modules or elements GWE 602, ESE 603 and RWE 604, each with its own regulatory regime/tax tags, namely GWE RR/T Tag 605, ESE RR/T 601 and RWE RR/T Tag 607. Each module or element transmits its tag into the MUX to which it is connected, where the RIAM 614 and the tax accounting module or element 619 receive the respective tags and configure their auditing and monitoring functions using the specified rules transmitted with each tag. This architecture provides that any hybrid game module or element, operating under any regulatory and tax regime, can be flexibly accommodated across any other regulatory and tax regime. This allows dynamically adding various hybrid game modules or elements regardless of their point of origin, or the point of service, whilst preserving regulatory and tax requirements. In addition, in various embodiments, a RIAM can access the regulatory regime of each hybrid game module or element (RWE, GWE, and ESE) and use information from that regulatory regime to shape its function. For example, it may not be permissible to interconnect modules or elements with a particular regulatory regime with modules or elements that are not regulated, or that are regulated by an authority that is unacceptable to the regulator of another module or element or modules or elements. In such case, the MUX, via interaction with the RIAM, would be able to disable certain un-allowed combinations.

In many embodiments, a RIAM can deployed in a highly independent manner, whereby its functionality is preprogrammed in accord with a regulator's requirements, and data is made available off-line for subsequent review by a regulatory authority. In some embodiments, the RIAM can be more interactive in nature, its actions slaved to commands provided in real-time or near real-time from a regulatory body (e.g. requiring an external system to approve certain actions—for example, interconnecting one module or element to another, or paying out a large jackpot—in response to data provided by the RIAM to that external system).

In various embodiments, a RIAM can receive data from the systems of a regulatory authority that will condition its performance in the context of a specific regulatory regime.

In some embodiments, the various functions of a marketplace MUX might be distributed over one or more other pieces of hardware and/or software comprising the overall architecture and the marketplace MUX systems, such as some modules or elements running on a remote server, others on a server in the "cloud" (located over the Internet in a different location).

In many embodiments, an RWE, GWE, ESE, one or more marketplace MUXs and any of these modules or elements internal modules or elements described herein can be implemented on multiple processing apparatuses, whether dedicated, shared or distributed in any combination thereof, or may be implemented on a single processing apparatus. In addition, while certain aspects and features of a gaming environment described herein have been attributed to any of the RWE, GWE, ESE, or marketplace MUXs, and any of their internal modules or elements, these aspects and features may be implemented in a hybrid form where any of the features or aspects may be performed by any of the aforementioned systems, modules or elements and modules or elements within a gaming system.

Figure 7:
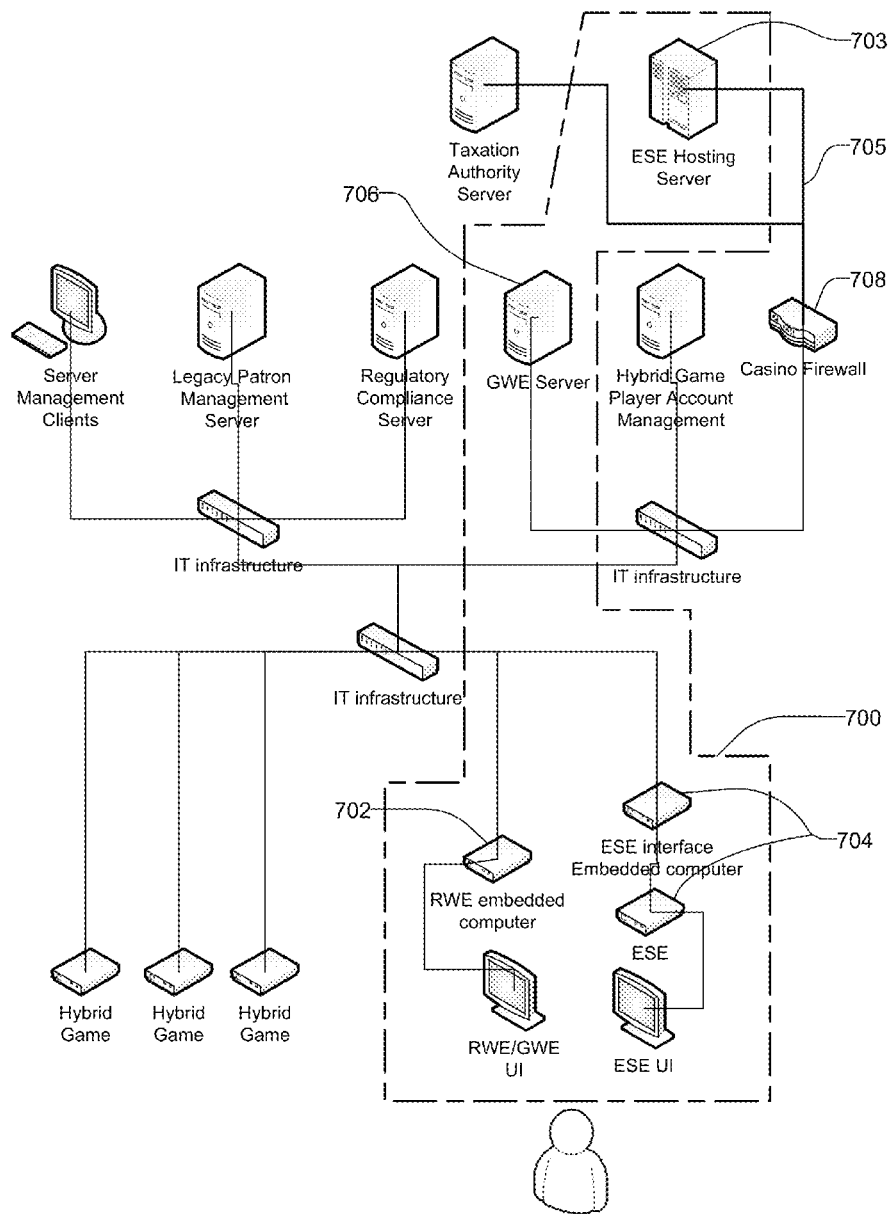
FIG. 7 is a diagram showing an implementation of a hybrid game in a casino in accordance with an exemplary embodiment.

FIG. 7 is a diagram showing an implementation of a hybrid game in a casino in accordance with an exemplary embodiment. In the figure, the hybrid game 700 components, RWE 702, ESE 704 and GWE 706 are bordered by the dashed line. Also pictured in the diagram are a number of other peripheral systems, such as player management, casino management, regulatory, and hosting servers that may be present in such an implementation. FIG. 7 also illustrates various other systems, which may reside outside the bounds of the casino and are connected to the framework via communications network, such as the Internet 705, depicted by the connection lines past the casino firewall 708. It should be understood that FIG. 7 does not attempt to illustrate all servers and systems to which a hybrid game 700 might be inevitably be connected, and indeed one might expect there would be others, but rather provides an example of a set of a sub-set of systems which would be present in an exemplary installation.

Figure 8:
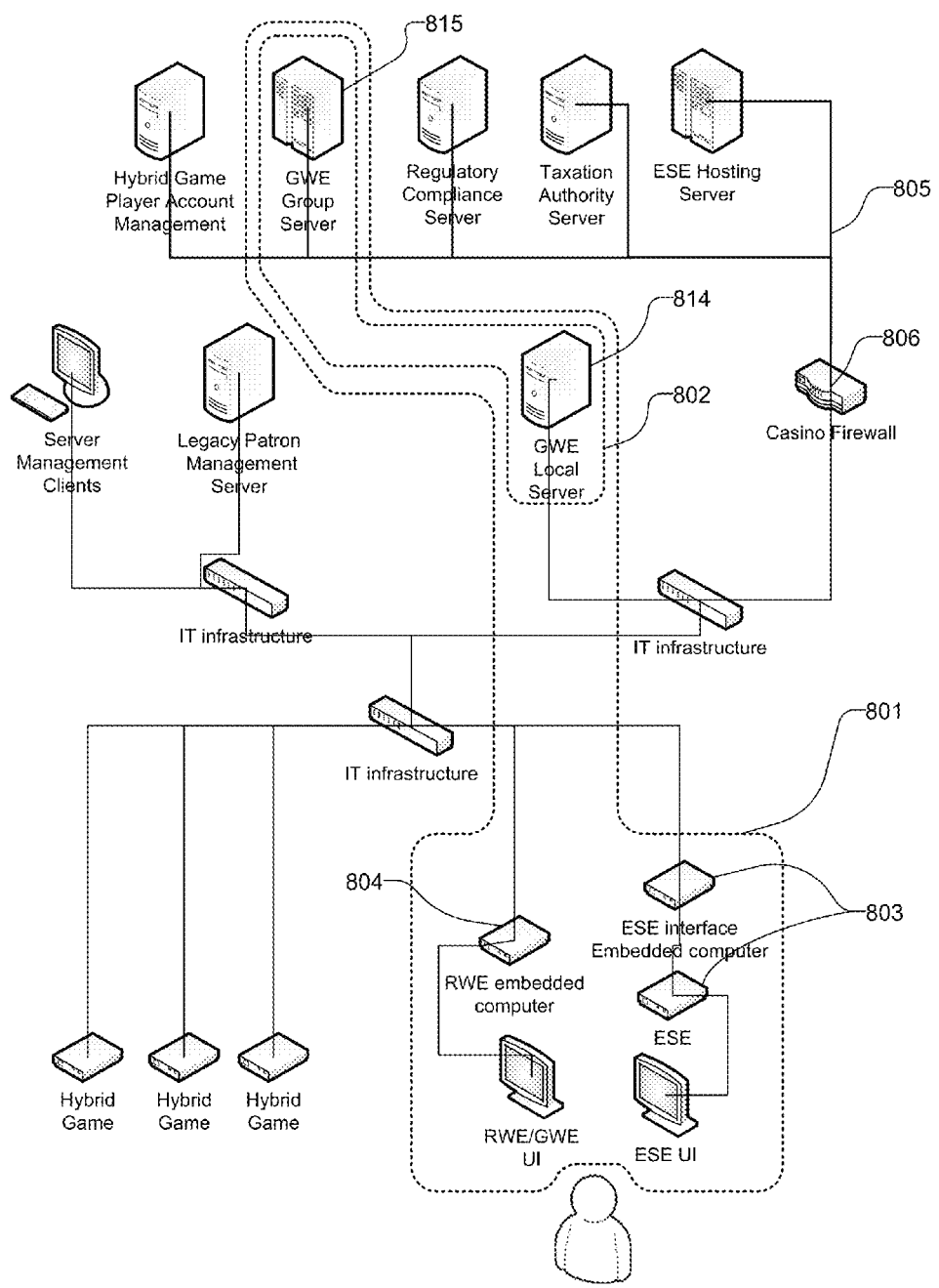
FIG. 8 is a diagram showing another implementation of a hybrid game in accordance with an exemplary embodiment.

FIG. 8 is a diagram showing another implementation of a hybrid game in accordance with an exemplary embodiment. Pictured are various components that under one implementation are the GWE 802, the ESE 803 and the RWE 804. In the figure, note that the GWE is comprised of two sub-components, a local GWE server 814, and a cloud server 815. (components within the dash line area 801). In the figure, certain of the components are located within the bounds of the casino, namely the RWE 804, the ESE 803 and a portion of the GWE 802, namely the local GWE server 814. The Cloud Server GWE 815 is located in the cloud connected to the casino bounded hybrid game components via communications network such as the Internet 805.

Figure 9:
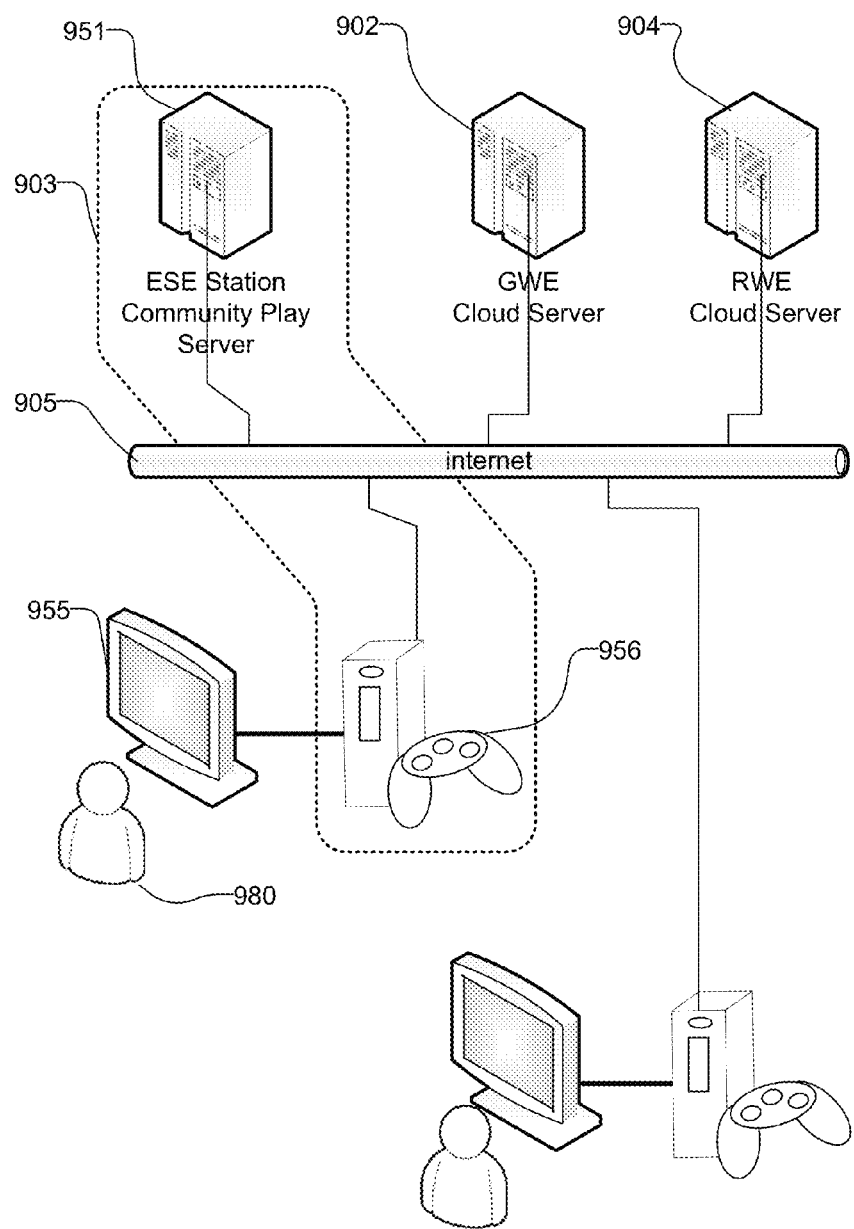
FIG. 9 is a diagram of another implementation of a hybrid game in accordance with an exemplary embodiment.

FIG. 9 is a diagram of another implementation of a hybrid game in accordance with an exemplary embodiment. In the diagram, a hybrid game 901 is composed of various components connected together by a communications network, such as the Internet 905. In this particular aspect, the ESE 903 is made up of sub components consisting of a typical home video game console 956 (or other types of home gaming computer) coupled to an ESE hosting server 951 which in this example provides for community and head to head play among multiple players on connected consoles 956, reflected in the diagram by the pictured second player and video game console. Also shown, is a UI 955 coupled to the video game console 956 to provide for a player 980 interface. The other core modules or elements of a hybrid game are also pictured, namely the GWE 902 in the form of a cloud server, and the RWE 904 in the form of a cloud server. It should be noted that the FIG. 9 implementation is the hybrid game architecture accomplished primarily in the cloud, functionally equivalent to the land based and semi-land based solutions shown in FIGS. 7 and 8.

There are many possible permutations of how a hybrid game could be constructed, with FIGS. 7, 8 and 9 showing only three possible permutations and provided as examples, which are not intended to suggest limitations to the forms of the architecture. Other embodiments include a version where the entire hybrid game is in the cloud with only a client running on player terminal within the bounds of the casino, or a version where the RWE and GWE are casino bound and the ESE exists in the cloud, accessed by a client running on a terminal in the casino.

Figure 10:
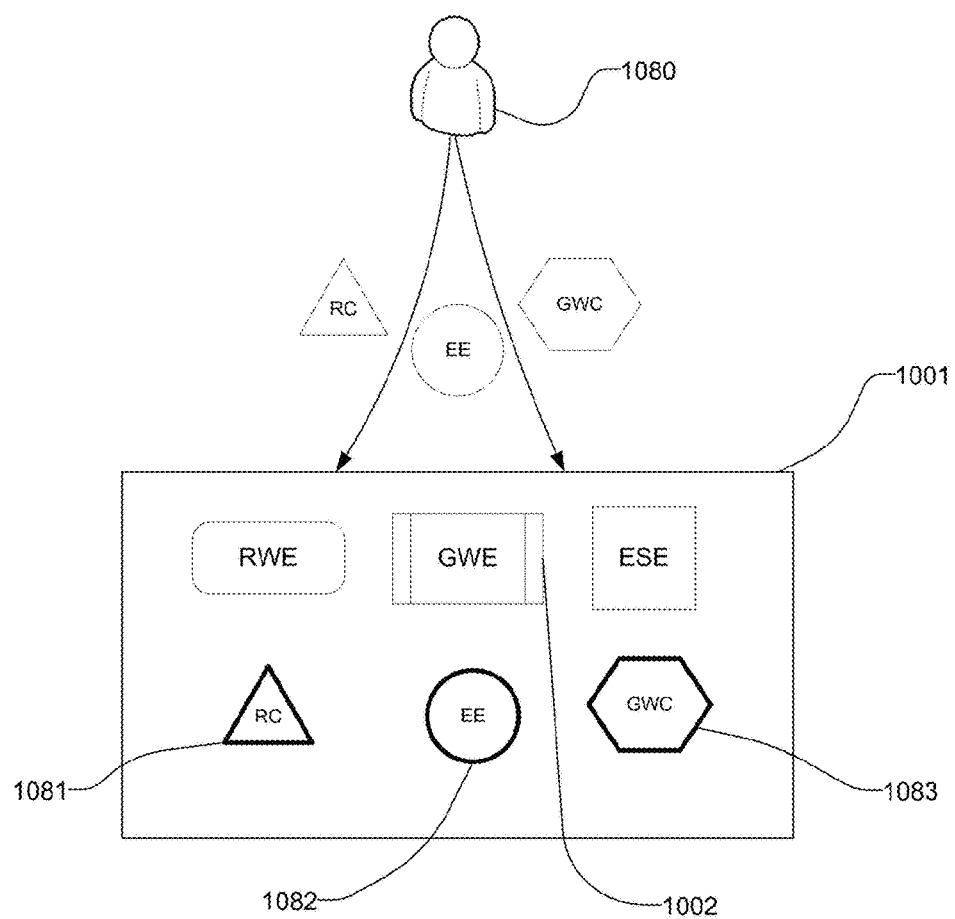
FIG. 10 illustrates an overview of an exemplary credit system of a hybrid game in accordance with an exemplary embodiment.

FIG. 10 illustrates an overview of an exemplary credit system of a hybrid game in accordance with an exemplary embodiment. In the figure, the player 1080 commences interaction with the game by contributing one or more of three types of credits to the game, the three being: (i) RC 1081 which is a currency fungible instrument, (ii) GWC 1083 which are game world credits, and (iii) EE 1082 which is the enabling module or element of the entertainment portion of the game running on the ESE. An enabling module or element is an module or element of an entertainment game is an module or element of the entertainment game that is consumed by, traded or exchanged in, operated upon, or used to enable the entertainment game portion of the hybrid game. There may be one or more types of EE present in a hybrid game's entertainment game. Examples of EE include bullets in a shooting game, fuel in a racing game, letters in a word spelling game, downs in a football game, potions in a character adventure game, character health points, etc.

The contribution of one or more of these modules or elements may be executed by insertion into the game of currency in the case of RC, and/or transferred in as electronic credit in the case of any of the RC, GWC and EE. Electronic transfer in of these credits may come via a smart card, voucher or other portable media, or as transferred in over a network from a patron server or hybrid game player account server. In certain implementations, these credits may not be transferred into the hybrid game, but rather drawn on demand from player accounts located in servers residing on the network or in the cloud on a real time basis as the credits are consumed by the hybrid game. Once these credits are deposited, or a link to their availability is made, the hybrid game has them at its disposal to use for execution of the game. Generally, the RC is utilized by and accounted for by the RWE 1004, and the EE 1082 and GWC 1083 are utilized and accounted for by the GWE and/or the ESE.

Figure 11:
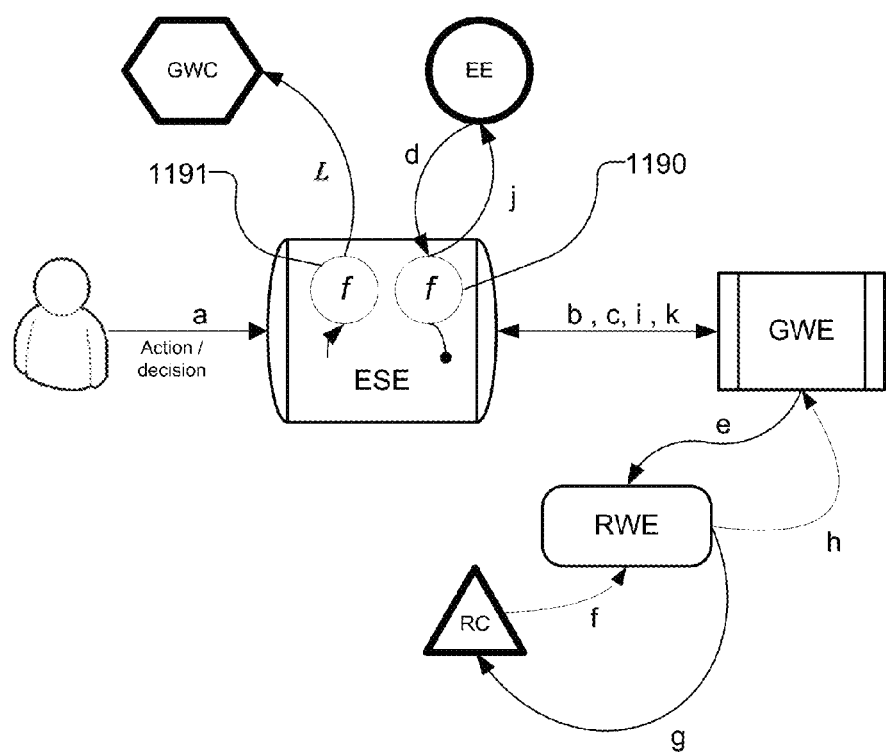
FIG. 11 shows an exemplary credit flow and management in a hybrid game in accordance with an exemplary embodiment.

FIG. 11 shows an exemplary credit flow and management in a hybrid game in accordance with an exemplary embodiment. Pictured in the figure are hybrid game modules or elements RWE, GWE and ESE, and the three types of credits, RC, EE and GWC as previously described. In FIG. 11, the following steps occur in credit flow and management:

TABLE 2

Hybrid Game Credit Flow and Management

| | |
|---|---|
| a | the player performs an action or makes a decision through the game UI |
| b | the ESE signals the GWE of the player decision or action taken |
| c | the GWE signals the ESE as to the amount of EE that will be consumed by the player action or decision. This signaling configures function 990 to control the EE consumption, decay or addition |
| d | the ESE consumes the amount of EE designated by the GWE to couple to the player action |
| e | the GWE signals the RWE as to the profile of the wager proposition associated with the particular action, and triggers the wager |
| f | the RWE consumes RC for the wager and executes the wager |
| g | the RWE returns RC depending on the outcome of the wager |
| h | the RWE informs the GWE as to the outcome of the wager |
| i | The GWE signals the ESE to add additional (or subtract, or add 0) EE to one or more of the EEs of the ESE entertainment game. This is reflected as function 990 in the figure. |
| j | The ESE reconciles the EE(s) of the entertainment game. |

TABLE 2-continued

Hybrid Game Credit Flow and Management k    The ESE signals the GWE as to its updated status, and the GWE signals the ESE to add additional (or subtract, or add 0) GWC to one or more of the GWC of the ESE entertainment game. This is reflected in function 991 in the figure.
L    The ESE reconciles the GWC(s) of the entertainment game.

The credit flow according to the method described above, can be illustrated by the following example in a first person shooter game, such as Call of Duty® again using the same hybrid game sequence:

TABLE 3

Example Hybrid Game Credit Flow and Management a    the player selects a machine gun to use in the game. The player fires a burst at an opponent.
     {the player performs an action or makes a decision through the game UI}
b    the ESE signals the GWE of the player's choice of weapon, that a burst of fire was fired, and the outcome of whether the player hit the opponent with the burst of fire.
     {the ESE signals the GWE of the player decision or action taken}
c    the GWE processes the information in b above, and signals the ESE to consume 3 bullets (EE) with each pull of the trigger.
     {the GWE signals the ESE as to the amount of EE that will be consumed by the player action or decision. This signaling configures function 990 to control the EE consumption, decay or addition}
d    the ESE entertainment game consumes 3 bullets (EE) since the trigger was pulled.
     {the ESE consumes the amount of EE designated by the GWE to couple to the player action}
e    the GWE signals the RWE that 3 credits (RC) are to be wagered to match the 3 bullets (EE) consumed, on a particular pay table (table Ln-RC) as a function how much damage the player inflicted on his/her opponent.
     {the GWE signals the RWE as to the profile of the wager proposition associated with the particular action, and triggers the wager}
f    the RWE consumes the 3 credits for the wager and executes the specified wager
     {the RWE consumes RC for the wager and executes the wager}
g    the RWE determines that the player hits a jackpot of 6 credits, and returns these 6 credits (RC) to the credit meter.
     {the RWE returns RC depending on the outcome of the wager}
h    the RWE informs the GWE that 3 credits (RC) net, were won
     {the RWE informs the GWE as to the outcome of the wager}
i    the GWE signals the ESE to add 3 bullets (EE) to the player's ammo clip
     {The GWE signals the ESE to add additional (or subtract, or add 0) EE to one or more of the EEs of the ESE entertainment game. This is reflected as function 990 in the figure}
j    the ESE adds back 3 bullets (EE) to the player's ammo clip in the entertainment game. This may take place by directly adding them to the clip, or may happen in the context of the entertainment game, such as the player finding extra ammo on the ground or in an old abandoned ammo dump.
     {The ESE reconciles the EE(s) of the entertainment game}
k    The GWE logs the new player score (GWC) in the game (as a function of the successful hit on the opponent) based on ESE signaling, and signals the ESE to add 2 extra points to their score since a jackpot was won.
     {The ESE signals the GWE as to its updated status, and the GWE signals the ESE to add additional (or subtract, or add 0) GWC to one or more of the GWC of the ESE entertainment game. This is reflected in function 991 in the figure}
L    the ESE adds 10 points to the player's score (GWC) given the success of the hit which in this example is worth 8 points, plus the 2 extra points requested by GWE.
     {The ESE reconciles the GWC(s) of the entertainment game.}

Note that the foregoing example in Table 3 is intended to provide an illustration of how credits flow in a hybrid game, but is not intended to be exhaustive and only lists only one of numerous possibilities of how a hybrid game may be configured to manage its fundamental credits.

Figure 12:
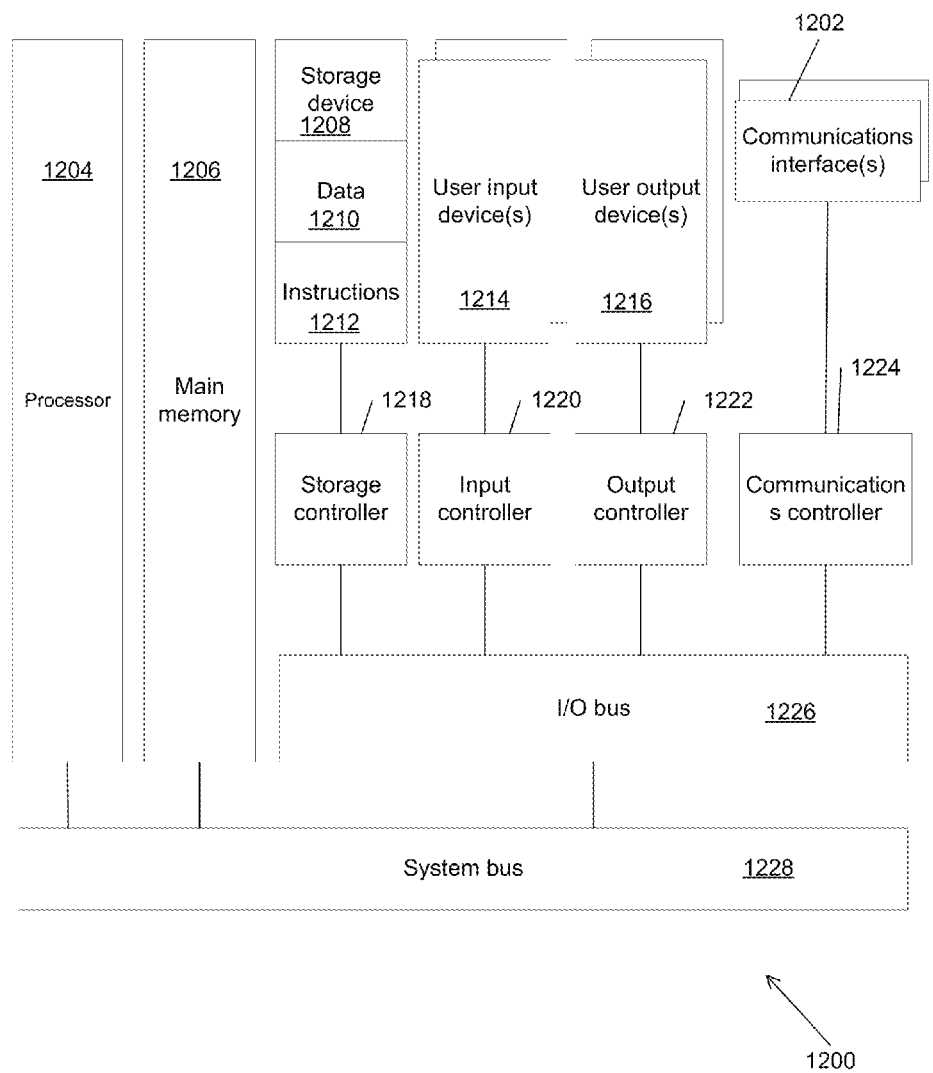
FIG. 12 illustrates a processing apparatus in accordance an exemplary embodiment.

Any of a variety of processing apparatuses can host various components of a regulated hybrid gaming system in accordance with embodiments of the invention. In several embodiments, these processing apparatuses can include, but are not limited to, a gaming machine, a general purpose computer, a computing device and/or a controller. A processing apparatus in accordance with various embodiments of the invention is illustrated in FIG. 12. In the processing apparatus 1200, a processor 1204 is coupled to a memory 1206 by a bus 1228. The processor 1204 is also coupled to non-transitory processor-readable storage media, such as a storage device 1208 that stores processor-executable instructions 1212 and data 1210 through the system bus 1228 to an I/O bus 1226 through a storage controller 1218. The processor 1204 is also coupled to one or more interfaces that may be used to connect the processor to other processing apparatuses as well as networks as described herein. The processor 1204 is also coupled via the bus to user input devices 1214, such as tactile devices like keyboards, keypads, foot pads, touch screens, trackballs, etc., as well as non-contact devices such as audio input devices, motion sensors and motion capture devices, etc. that the processing apparatus may use to receive inputs from a user when the user interacts with the processing apparatus. The processor 1204 is connected to these user input devices 1214 through the system bus 1228, to the I/O bus 1226 and through the input controller 1220. The processor 1204 is also coupled via the bus to user output devices 1216 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 1228 to the I/O bus 1226 and through the output controller 1222. The processor 1204 can also be connected to a communications interface 1202 from the system bus 1228 to the I/O bus 1226 through a communications controller 1224.

In various embodiments, a processor loads the instructions and the data from the storage device into the memory and executes the instructions and operates on the data to implement the various aspects and features of the components of a gaming environment as described herein. The processor uses the user input devices and the user output devices in accordance with the instructions and the data in order to create and operate user interfaces for players, casino operators, owners, etc. as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as a USB memory device, an optical CD ROM, magnetic media such as tape or disks, etc. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of a gaming environment, a marketplace MUX, an RWE, a GWE or an ESE as described herein can be implemented on one or more processing apparatuses, whether dedicated, shared or distributed in any combination thereof, or may be implemented on a single processing apparatus. In addition, while certain aspects and features of a gaming and regulatory monitoring system described herein have been attributed to a marketplace MUX, an RWE, a GWE or an ESE, these aspects and features may be implemented in a hybrid form where any of the features or aspects may be performed by any of marketplace MUX, an RWE, a GWE or an ESE within a gaming environment without deviating from the spirit of the embodiments disclosed herein.

While the above description contains many specific embodiments of the invention, these should not be construed as limitations on the scope of the invention, but rather as an example of one embodiment thereof. It is therefore to be understood that the invention can be practiced otherwise than as specifically described, without departing from the scope and spirit of the invention. Thus, embodiments of the invention should be considered in all respects as illustrative and not restrictive.

What is claimed is:

1. A regulated hybrid gaming system, comprising:
    a terminal including an entertainment software controller coupled to a gaming environment multiplexer, wherein the entertainment software controller is constructed to:
        receive from a player a contribution of a credit; and
        provide an entertainment game to the player;
    a real world controller constructed to provide a gambling game in which the credit is wagered; and
    the gaming environment multiplexer, wherein the gaming environment multiplexer is constructed to:
        receive from a game world controller via a network, a request for coupling the game world controller to the entertainment software engine providing the entertainment game;
        determine that the game world controller is approved for a regulatory regime; and
        couple via the network the game world controller to the entertainment software controller, when the multiplexer determines that the game world controller is approved for the regulatory regime, whereby the game world controller couples the entertainment game of the entertainment software controller to the gambling game of the real world controller associated with the gaming environment multiplexer.

2. The regulated hybrid gaming system of claim 1, wherein the gaming environment multiplexer is further constructed to determine that the entertainment software controller is approved for the regulatory regime, and
wherein the entertainment software controller is made available for coupling to the game world controller when the gaming environment multiplexer determines that the entertainment software controller is approved for the regulatory regime.

3. The regulated hybrid gaming system of claim 1, wherein the gaming environment multiplexer is further constructed to determine that the real world controller is approved for the regulatory regime, and
wherein the real world controller is made available for coupling to the game world controller when the gaming environment multiplexer determines that the real world controller is approved for the regulatory regime.

4. The regulated hybrid gaming system of claim 1, wherein the gaming environment multiplexer is further constructed to receive from the game world controller via the network a regulatory regime/tax tag for a regulatory inspection/action tracking module of the gaming environment multiplexer.

5. The regulated hybrid gaming system of claim 1, wherein the gaming environment multiplexer is further constructed to receive from the entertainment software controller via the network, a regulatory regime/tax tag for a regulatory inspection/action tracking module of the gaming environment multiplexer.

6. The regulated hybrid gaming system of claim 1, wherein the gaming environment multiplexer is further constructed to receive from the real world controller via the network a regulatory regime/tax tag for a regulatory inspection/action tracking module of the gaming environment multiplexer.

7. The regulated hybrid gaming system of claim 1, wherein the credit is a currency fungible instrument.

8. The regulated hybrid gaming system of claim 1, wherein the credit is a game world credit.

9. The regulated hybrid gaming system of claim 1, wherein the credit is an enabling element of an entertainment game running on the entertainment software controller.

10. The regulated hybrid gaming system of claim 1, wherein the game world controller and the real world controller are constructed from the same device.

* * * * *